(12) United States Patent
Spencer

(10) Patent No.: US 8,199,151 B2
(45) Date of Patent: Jun. 12, 2012

(54) ANIMATION EVENTS

(75) Inventor: Nicholas MacDonald Spencer, Oxford (GB)

(73) Assignee: Naturalmotion Ltd., Oxford (GB)

( * ) Notice: Subject to any disclaimer, the term of this patent is extended or adjusted under 35 U.S.C. 154(b) by 695 days.

(21) Appl. No.: 12/370,765

(22) Filed: Feb. 13, 2009

(65) Prior Publication Data

US 2010/0207949 A1    Aug. 19, 2010

(51) Int. Cl.
  *G06T 15/00*    (2011.01)
(52) U.S. Cl. ........ 345/473; 345/474; 345/475; 345/505; 345/586; 345/648; 700/246; 700/252; 703/1; 703/2
(58) Field of Classification Search .................. 345/473, 345/474, 475, 505, 586, 648; 703/1, 2; 700/246, 700/252
  See application file for complete search history.

(56) References Cited

U.S. PATENT DOCUMENTS

| | | | | |
|---|---|---|---|---|
| 6,162,190 | A * | 12/2000 | Kramer | 600/595 |
| 6,243,106 | B1 * | 6/2001 | Rehg et al. | 345/473 |
| 6,810,300 | B1 * | 10/2004 | Woltman et al. | 700/132 |
| 7,136,722 | B2 * | 11/2006 | Nakamura et al. | 700/245 |
| 7,573,477 | B2 * | 8/2009 | Ng-Thow-Hing | 345/473 |
| 7,685,081 | B2 * | 3/2010 | Reil | 706/23 |
| 7,859,540 | B2 * | 12/2010 | Dariush | 345/474 |

OTHER PUBLICATIONS

"Motion Abstraction and Mapping with Spatial Constraints" Bindiganavale et al., Published in "CAPTECH '98: Proceedings of the International Workshop on Modelling and Motion Capture Techniques for Virtual Environments", Nov. 1998, pp. 770-782; ISBN=3-540-65353-8; Publisher = Springer-Verlag, London, UK.

"Knowing When to Put Your Foot Down", Ikemoto et al., Published in "I3D '06: Proceedings of the 2006 symposium on Interactive 3D graphics and games", 2006, pp. 49-53; ISBN=1-59593-295-X; publisher = ACM, New York, NY, USA.

"Robust Kinematic Constraint Detection for Motion Data" Callennec et al., Published in "Proceedings of ACM SIGGRAPH/Eurographics Symposium on Computer Animation", Sep. 2006; 10 pages.

"Synthesis of Complex Dynamic Character Motion from Simple Animations" Liu et al., Published in "SIGGRAPH '02: Proceedings of the 29th Annual Conference on Computer Graphics and Interactive Techniques", 2002, pp. 408-416, ISBN=1-58113-521-1, publisher = ACM, New York, NY, USA.

"Motion Abstraction and Mapping with Spatial Constraints" Bindiganavale et al., Published in "CAPTECH '98: Proceedings of the International Workshop on Modelling and Motion Capture Techniques for Virtual Environments", Nov. 1998; ISBN=3-540-65353-8; Publisher = Springer-Verlag, London, UK; pp. 70-82.

* cited by examiner

*Primary Examiner* — Phu Nguyen
(74) *Attorney, Agent, or Firm* — Westman, Champlin & Kelly, P.A.

(57) ABSTRACT

A method of detecting an occurrence of an event of an event type during an animation, in which the animation comprises, for each of a plurality of object parts of an object, data defining the respective movement of that object part at each of a sequence of time-points for the animation, the method comprising: indicating the event type, wherein the event type specifies: one or more of the object parts; and a sequence of two or more event phases that occur during an event of that event type such that, for each event phase, the respective movements of the one or more specified object parts during that event phase are each constrained according to a constraint type associated with that event phase; and detecting an occurrence of an event of the event type by detecting a section of the animation during which the respective movements defined by the animation for the specified one or more object parts are constrained in accordance with the sequence of two or more event phases.

29 Claims, 10 Drawing Sheets

| Event phase ID | 1 | 2 | 3 |
|---|---|---|---|
| Event phase name | "Heel strike" | "Foot plant" | "Toe off" |
| Constraint type | Hinge constraint | Identity constraint | Point constraint |
| Duration | $N_1$ frames | $N_2$ frames | $N_3$ frames |
| Ankle geometry | $\mathbf{x}, \hat{a}$ | $\mathbf{x} = \mathbf{0}$, $\hat{a} = 0$ | $\mathbf{x},$ $\hat{a} = 0$ |
| Ankle statistics | $\sigma_\theta^2, \sigma_x^2, \sigma_{\hat{a}}^2$ | $\sigma_\theta^2$ | $\sigma_\theta^2, \sigma_x^2$ |
| Toe geometry | $\mathbf{x}, \hat{a}$ | $\mathbf{x} = \mathbf{0}$, $\hat{a} = 0$ | $\mathbf{x},$ $\hat{a} = 0$ |
| Toe statistics | $\sigma_\theta^2, \sigma_x^2, \sigma_{\hat{a}}^2$ | $\sigma_\theta^2$ | $\sigma_\theta^2, \sigma_x^2$ |

ANIMATION EVENTS

FIELD OF THE INVENTION

The present invention relates to a method of, and apparatus for, detecting the occurrence of an event of an event type during an animation. The present invention also relates to a method of, and apparatus for, generating a description of an event of an event type that occurs during an animation.

BACKGROUND OF THE INVENTION

There have been several previously proposed methods for detecting when a certain event or action occurs within an animation. For example, a prior approach to detecting when, during an animation of a virtual animal, that animal places a foot on the ground (i.e. a footfall), involves simply checking the height and speed of that foot. However, such a method is often very sensitive to noisy or imperfect animation data.

Some prior approaches require a large computer learning process to allow a computer to classify event occurrences. However, they suffer from not being able to generalise the event detection to more arbitrary animation objects. Other prior approaches require a large amount of input from a user to manually input tolerances or to label a large number of animation frames in order to be able to detect events.

SUMMARY OF THE INVENTION

It would be desirable to overcome the above-mentioned problems in the prior art.

As an overview, embodiments of the invention make use of an event template that provides a representation (description or definition) of a particular event type. The event template can be formed by a user simply identifying a sequence of two or more event sections (or motion phases) in a sample animation, i.e. two or more separate periods that occur during an event of that event type. During each motion phase, the movement of various parts of the object being animated is limited (or constrained or inhibited or controlled or restricted) based on one or more constraints. These constraints, object parts, and motion phases are specified in the event template.

A user simply specifies the various object parts, identifies (by looking at a sample animation) an occurrence of an event, and specifies when the motion phases occur during that event together with the associated type of limitation on the movement of the object parts. From this, an event template may be automatically generated that characterises an event of the event type. This event template may then be used to search through a target animation to locate occurrences of an event by identifying any instances or portions of that target animation during which the motion in that animation has similar characteristics to that defined by the template.

According to a first aspect of the invention, there is provided a method of detecting an occurrence of ah event of an event type during an animation, in which the animation comprises, for each of a plurality of object parts of an object, data defining the respective movement of that object, part at each of a sequence of time-points for the animation, the method comprising: indicating the event type, wherein the event type specifies: one or more of the object parts; and a sequence of two or more event phases that occur during an event of that event type such that, for each event phase, the respective movements of the one or more specified object parts during that event phase are each constrained according to a constraint type associated with that event phase; and detecting an occurrence of an event of the event type by detecting a section of the animation during which the respective movements defined by the animation for the specified one or more object parts are constrained in accordance with the sequence of two or more event phases.

Thus, embodiments of the invention provide a transformation of a target animation and a description of an event type into data that specifies when one or more instances of an event of that event type occur during that target animation.

The constraint type for an event phase may specify that, during that event phase, at least one degree of freedom is constrained for the respective movements of the specified one or more object parts.

The constraint type for an event phase may specify that, during that event phase, all of the specified one or more object parts undergo no translation in one or more respective directions. Additionally or alternatively, the constraint type for an event phase may specify that, during that event phase, all of the specified one or more object parts undergo no rotation in one or more respective directions.

The constraint type for an event phase may specify one of: a constraint specifying that each of the specified one or more object parts remains stationary during that event phase; a constraint specifying that each of the specified one or more object parts rotationally hinges about a respective straight line of fixed points (i.e. an axis) during that event phase; or a constraint specifying that each of the specified one or more object parts pivots about a respective fixed point during that event phase.

In some embodiments, specifying the sequence of two or more event phases may comprise providing timing data that indicates, for each event phase, when that event phase occurs during an event of the event type. The timing data may indicate, for each event phase, a duration for that event phase.

In some embodiments, detecting an occurrence of an event of the event type may comprise: for one or more of the time-points: (a) identifying a sequence of sections of the animation by identifying, for each event phase, a corresponding section of the animation based on that time-point and the timing data indicating when that event phase occurs during an event of the event type; and (b) calculating a likelihood value for the sequence of sections of the animation, wherein the likelihood value represents a probability that, for each event phase, the respective movements defined by the animation for the one or more specified object parts during the corresponding section of the animation identified in step (a) are constrained in accordance with the constraint type associated with that event phase.

In some embodiments, detecting an occurrence of an event of the event type may further comprise, for each of the one or more time-points, detecting an event of the event type as occurring at that time-point if the likelihood value calculated for that time-point is above a threshold value.

In some embodiments, detecting an occurrence of an event of the event type may comprise: for each of the one or more time-points: repeating step (a) above to identify a plurality of different sequences of sections of the animation; repeating step (b) above to calculate a likelihood value for each of the different sequences of sections of the animation; and determining the sequence of sections of the animation identified at step (a) that results in a largest likelihood value at step (b).

In some embodiments, identifying the plurality of different sequences of sections of the animation for a time-point may comprise, for one or more of the event phases, varying the duration of the corresponding section of the animation to identify different sequences of sections of the animation.

In some embodiments, varying the duration of the section of the animation corresponding to an event phase may comprise varying that duration within a range of durations containing a duration of that event phase.

In some embodiments, the likelihood value calculated at step (b) for a particular sequence of sections of the animation may be weighted based on a degree of similarity between the durations of the event phases and the durations of the corresponding sections of the animation of that particular sequence.

In some embodiments, detecting an occurrence of an event of the event type further may comprise, for each of the one or more time-points, detecting an event of the event type as occurring at that time-point if the largest likelihood value calculated for that time-point is above a threshold value.

In some embodiments, the event type also specifies, for each event phase and for each object part, one or more motion parameters that characterise movement of that object part during that event phase, and step (b) calculates the likelihood value based on these motion parameters.

The one or more motion parameters for an event phase and an object part may comprise data representing a degree of variance of a particular motion of that object part during that event phase.

The one or more motion parameters for an event phase and an object part may comprise data representing geometry for the movement of that object part. The data representing geometry may, for at least one event phase, identify at least one of: an axis about which that object part rotates during that event phase; and a point about which that object part pivots during that event phase.

According to a second aspect of the invention, there is provided a method of detecting an occurrence of an event of an event type during an animation, in which the animation comprises, for each of a plurality of object parts of an object, data defining the respective movement of that object part at each of a sequence of time-points for the animation, the method comprising: indicating the event type, wherein the event type specifies: two or more of the object parts; and an event phase that occurs during an event of that event type such that, for that event phase, the respective movements of the two or more specified object parts during that event phase are each constrained according to a constraint type associated with that event phase; and detecting an occurrence of an event of the event type by detecting a section of the animation during which the respective movements defined by the animation for the specified two or more object parts are constrained in accordance with the constraint type of the specified event phase.

According to a third aspect of the invention, there is provided a method of updating an animation, the method comprising: detecting an occurrence of an event of an event type during that animation using a method according to the above first aspect of the invention; and storing in the animation data that indicates the event type and the location in the animation of the detected occurrence.

Thus, embodiments of the invention provide a transformation of a target animation into a marked-up, or updated, animation that also contains data that specifies when one or more instances of an event of that event type occur during that target animation.

According to a fourth aspect of the invention, there is provided a method of updating an animation database, the method comprising: for each of one or more animations in the animation database, updating that animation using a method according to the above second aspect of the invention.

Thus, embodiments of the invention provide a transformation of an animation database into an animation database that contains animations which have been marked-up so as to include data that specifies when one or more instances of an event of that event type occur during those animations.

According to a fifth aspect of the invention, there is provided a method of generating a description of an event of an event type that occurs during an animation, in which the animation comprises, for each of a plurality of object parts of an object, data defining the respective movement of that object part at each of a sequence of time-points for the animation, the method comprising: a user specifying one or more of the object parts that are involved in an event of the event type; the user specifying a sequence of two or more event phases that occur during an event of the event type and, for each event phase, an associated constraint type such that, for each event phase, the respective movements of the one or more specified object parts during that event phase are each constrained according to the constraint type associated with that event phase; the user identifying one or more occurrences in the animation of an event of the event type and, for each occurrence, when in the animation each event phase occurs; for each event phase, using the respective movements of the one or more specified object parts during that event phase in each of the one or more identified occurrences of an event of the event type to automatically calculate geometry data representing the constraint type associated with that event phase; and storing a description of the event type, wherein the description comprises: data identifying the one or more specified object parts, the specified sequence of two or more event phases, and the constraint types associated with the event phases; and the geometry data for each event phase.

Thus, embodiments of the invention provide a transformation of an animation and input from a user into a description of an event type that may be subsequently used to detect when events of that event type occur in one or more animations.

The constraint type for an event phase may specify that, during that event phase, at least one degree of freedom is constrained for the respective movements of the specified one or more object parts.

The constraint type for an event phase may specify that, during that event phase, all of the specified one or more object parts undergo no translation in one or more respective directions. Additionally or alternatively, the constraint type for an event phase may specify that, during that event phase, all of the specified one or more object parts undergo no rotation in one or more respective directions.

The constraint type for an event phase may specify one of: a constraint specifying that each of the specified one or more object parts remains stationary during that event phase; a constraint specifying that each of the specified one or more object parts rotationally hinges about a respective straight line of fixed points (i.e. an axis) during that event phase; or a constraint specifying that each of the specified one or more object parts pivots about a respective fixed point during that event phase.

In some embodiments, the geometry data is calculated separately for each of the specified one or more object parts.

In some embodiments, for at least one event phase, the geometry data identifies at least one of: an axis about which an object part rotates during that event phase; and a point about which an object part pivots during that event phase.

In some embodiments, for each event phase and each of the specified one or more object parts, the method comprises using the respective movements of that object part during that event phase in each of the one or more identified occurrences of an event of the event type to automatically calculate statistics data representing a degree of variance of the respective movement of that object part during that event phase; and the step of storing is arranged such that the description also comprises the calculated statistics data.

According to a sixth aspect of the invention, there is provided a method of generating a description of an event of an event type that occurs during an animation, in which the animation comprises, for each of a plurality of object parts of an object, data defining the respective movement of that object part at each of a sequence of time-points for the animation, the method comprising: a user specifying two or more of the object parts that are involved in an event of the event type; the user specifying an event phase that occurs during an event of the event type and an associated constraint type such that the respective movements of the two or more specified object parts during that event phase are each constrained according to the constraint type associated with that event phase; the user identifying one or more occurrences in the animation of an event of the event type and, for each occurrence, when in the animation the event phase occurs; using the respective movements of the two or more specified object parts during the event phase in each of the one or more identified occurrences of an event of the event type to automatically calculate geometry data representing the constraint type associated with the event phase; and storing a description of the event type, wherein the description comprises: data identifying the two or more specified object parts, the specified event phase, and the constraint type associated with the event phase; and the geometry data for the event phase.

According to a seventh aspect of the invention, there is provided an apparatus arranged to detect an occurrence of an event of an event type during an animation, in which the animation comprises, for each of a plurality of object parts of an object, data defining the respective movement of that object part at each of a sequence of time-points for the animation, the apparatus comprising: a memory unit storing an indication of the event type, wherein the event type specifies: one or more of the object parts; and a sequence of two or more event phases that occur during an event of that event type such that, for each event phase, the respective movements of the one or more specified object parts during that event phase are each constrained according to a constraint type associated with that event phase; and a processor arranged to execute an event detection module to detect an occurrence of an event of the event type by detecting a section of the animation during which the respective movements defined by the animation for the specified one or more object parts are constrained in accordance with the sequence of two or more event phases.

According to an eighth aspect of the invention, there is provided an apparatus arranged to generate a description of an event of an event type that occurs during an animation, in which the animation comprises, for each of a plurality of object parts of an object, data defining the respective movement of that object part at each of a sequence of time-points for the animation, the apparatus comprising a memory unit and a processor, wherein: the processor is arranged to execute a user interface module to allow a user to: specify one or more of the object parts that are involved in an event of the event type; specify a sequence of two or more event phases that occur during an event of the event type and, for each event phase, an associated constraint type such that, for each event phase, the respective movements of the one or more specified object parts during that event phase are each constrained according to the constraint type associated with that event phase; and identifying one or more occurrences in the animation of an event of the event type and, for each occurrence, when in the animation each event phase occurs; the processor is arranged to execute a module that uses the respective movements of the one or more specified object parts during that event phase in each of the one or more identified occurrences of an event of the event type to automatically calculate geometry data representing the constraint type associated with that event phase; and the processor is arranged to store, in the memory unit, a description of the event type, wherein the description comprises: data identifying the one or more specified object parts, the specified sequence of two or more event phases, and the constraint types associated with the event phases; and the geometry data for each event phase.

According to a ninth aspect of the invention, there is provided a computer-readable medium storing computer-executable instructions for carrying out any of the above-mentioned aspects of the invention.

In this way, the input required from a user to characterise an event type is kept minimal, whilst complex event types may be established and defined based on more basic motion or constraint types. In particular, the user is only required to mark up one, or a small number, of example instances of an event in order to generate an event template characterising and defining the idealized, or expected, motion for that event type. Furthermore, the matching process is robust against changes in timings of events during a target animation. It is also robust against noisy or imperfect animation data since it may use convolution techniques and peak detection techniques.

BRIEF DESCRIPTION OF THE DRAWINGS

Embodiments of the invention will now be described, by way of example only, with reference to the accompanying drawings, in which:

FIG. 3 schematically illustrates an example event template according to an embodiment of the invention;

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1) Overview 1.1) Animations

As an overview, embodiments of the invention are concerned with animations. Some embodiments of the invention are concerned with detecting when (or the location or time-point at which) one or more events occur during an animation. Some embodiments of the invention are concerned with how to define a particular type of event, so that the occurrence of events of that type may then be detected in an animation.

An animation of interest for embodiments of the invention is one which is an animation of a virtual object (or a character) in a virtual environment. The animation comprises animation data that provides (or indicates or represents) the position (i.e. location and orientation) of the object within the virtual environment at each of a sequence of time-points. These time-points may correspond to video frames, video fields, or any other time or display frequency of interest. As the animation involves movement of the object over time (i.e. across the sequence of time-points), this animation data represents movement of the object at each time-point in the sequence of time-points. The animation data for an animation may therefore be in a form that (a) indicates the actual position of the object in the virtual environment at each time-point, or (b) indicates the movement of the object in the virtual environment from one time point to a subsequent time-point, or (c) is a combination or variation of (a) and/or (b).

The animation therefore comprises data that may be used to provide or generate a sequence of images representing the movement of the object from image to image.

For ease of explanation, the rest of this description shall refer to frames (and a sequence of frames) as an example of time-points (and the sequence of time-points for the animation). However, the skilled person Will appreciate that embodiments of the invention relate to time-points in general and not just video frames (or video images).

Figure 1:
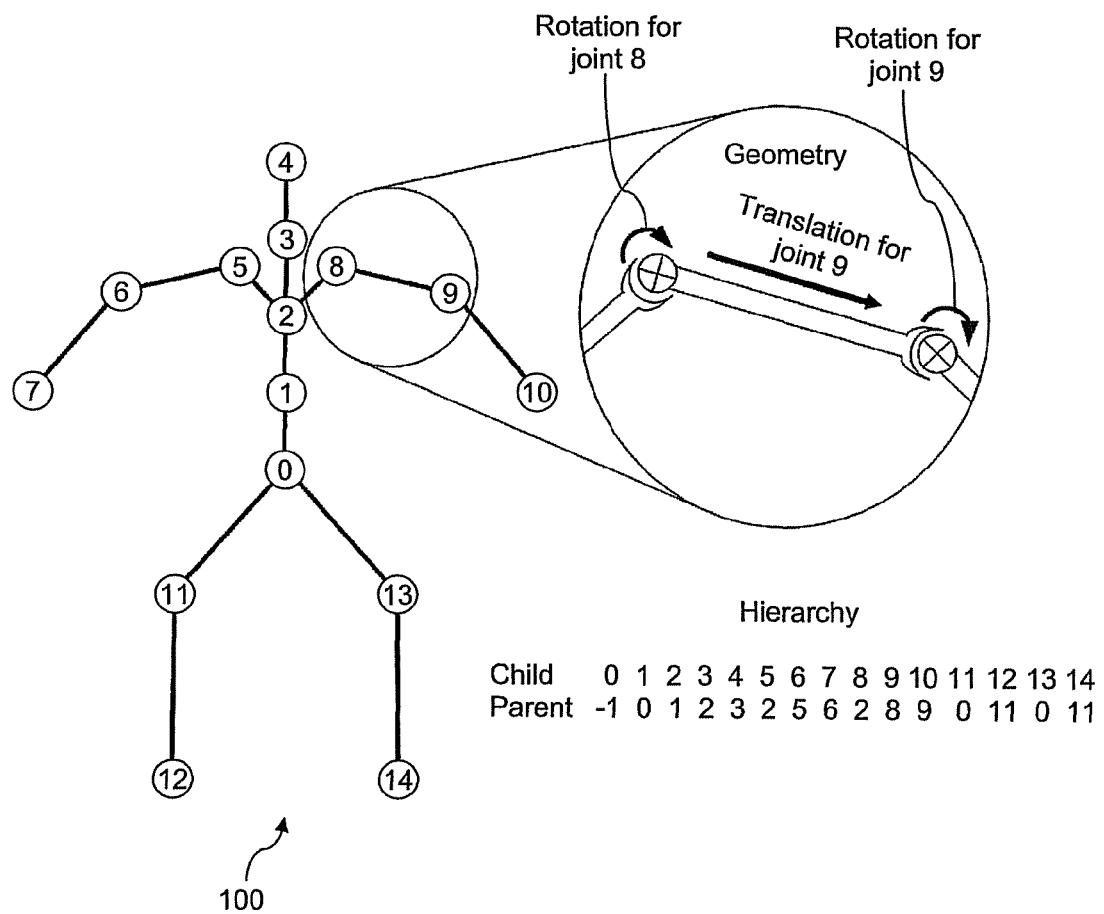
FIG. 1 schematically illustrates an object in an animation according to an embodiment of the invention.

FIG. 1 schematically illustrates an object 100 in an animation according to an embodiment of the invention. The example object 100 in FIG. 1 is intended to represent a human being that is to be animated. However, it will be appreciated that embodiments of the invention may involve animations of other types, structures and forms of object that have different intended representations.

The object 100 comprises a plurality of object sections (or "bones") linked together by respective joints. In FIG. 1, the sections of the object 100 are the straight lines whilst the joints of the object 100 are the numbered circles.

In general, a joint is a (simulated) point of contact between two object sections so that that joint links (or creates an association between) those two sections. In other words, such a joint forms a simulated connection or tie between two object sections (in the same way that, for example, a forearm is connected to an upper arm by virtue of an elbow joint). In this way an object section may have one or more joints associated with it. A joint normally occurs at an end of the object section(s) it is associated with.

Some joints (such as joint 10 in FIG. 1) occur at the end of an object section, but do not link that section to another section. These joints merely serve to indicate the location of the free (i.e. unconnected) end of that section.

In some embodiments, each object section is "rigid" in that the distance between the joints associated with that section is constant, although, of course, each rigid section may have its own length/distance which may be different from the length/distance for the other rigid sections. However, it will be appreciated that in other embodiments one or more of the sections of the object 100 may not be "rigid".

The object 100 may therefore be considered to comprise a plurality of object parts. In some embodiments, the object 100 is represented as a plurality of joints (i.e. the object parts are just the joints). In some embodiments, the object 100 is represented as a plurality of object sections (i.e. the object parts are just the bones). In some embodiments, the object 100 is represented as a plurality of joints together with a plurality of object sections. The actual representation does not matter for embodiments of the invention and therefore this description shall represent the object 100 as a plurality of joints. However, the skilled person will appreciate that the following description may be applied analogously to the alternative styles of representation.

The object parts may be considered as forming a skeleton, or framework, for the object 100.

The object parts (joints in this representation) are linked together, or associated with each other, in a hierarchy. The hierarchy of joints illustrated in FIG. 1 may be represented by table 1 below:

TABLE 1

| Joint ID  | 0  | 1 | 2 | 3 | 4 | 5 | 6 | 7 | 8 | 9 | 10 | 11 | 12 | 13 | 14 |
|-----------|----|---|---|---|---|---|---|---|---|---|----|----|----|----|----|
| Parent ID | −1 | 0 | 1 | 2 | 3 | 2 | 5 | 6 | 2 | 8 | 9  | 0  | 11 | 0  | 13 |

In this hierarchy of joints for the object 100, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of −1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 100, i.e. to indicate the location of the extremities of the object 100. Due to the connecting nature of the object sections that link joints, the movement, position and orientation of a joint in the virtual environment is affected by the movement, position and orientation of the parent of that joint in the virtual environment.

The animation data comprises data (referred to as "topological data") that represents this hierarchy, i.e. data defining the parent-child relationships between the various object parts that make up the object 100. For example, the animation could store the topological data in the form of table 1 above.

The animation data also comprises data (referred to as "geometric data") that represents the relative positions and orientations of the object parts. In effect, this geometric data represents the length of each object section (bone) together with its orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments of the invention, these methods shall not be described in more detail herein. An example representing some of the geometric data for joints 8 and 9 is shown in FIG. 1.

It is worth noting that the geometric data for a particular joint is normally defined in a coordinate space local to the parent of that joint (i.e. in which that parent is fixed). Thus, for example, if a "shoulder joint" moves but the elbow joint does not, then the geometric data for the elbow joint would not change.

The animation data comprises, for each frame for the animation, respective geometric data for that frame. Thus, the animation comprises, for each of a plurality of object parts of an object, data defining the respective position of that object part at each frame of the sequence of frames. This data therefore represents or provides the movement(s) of the object parts from frame to frame.

Alternatively, in some embodiments, the geometric data for a frame may comprise data representing the movement(s) of the object parts at the current frame with reference to a preceding (e.g. the immediately preceding) frame. This may be represented, for example, in the form of a rotation matrix and a translation vector for each object part, or some other way or representing the difference in the position and orientation of one joint between the current frame and the preceding frame. In this way too, the animation comprises, for each of a plurality of object parts of an object, data defining the respective movement of that object part at each frame of the sequence of frames.

The animation may comprise further data, such as (a) data to enable so-called "skinning" for the animation and possibly also (b) data to enable so-called "rendering" of the animation. The process of skinning takes a definition of the surface of the object and attaches it to the skeleton formed by the object parts (the joints and/or bones)—thus, the animation may comprise data providing such a definition. The process of rendering actually outputs or displays the skinned surface with relevant textures, colours, lighting etc. as appropriate—thus, the animation may comprise data providing information defining one or more of the texture, colouring, lighting, etc.

1.2) System Overview

Figure 2:
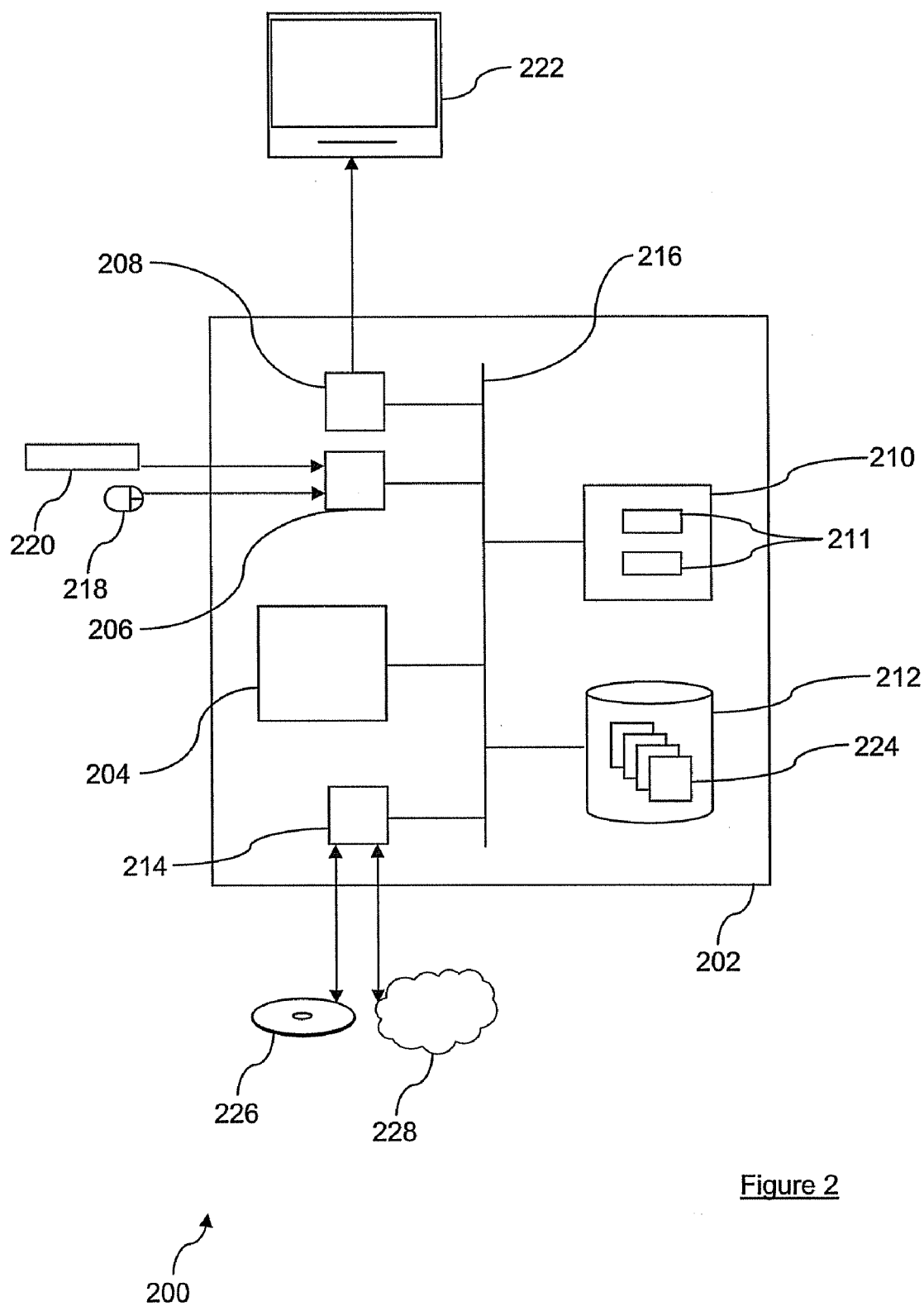
FIG. 2 schematically illustrates an example computer system according to an embodiment of the invention.

Embodiments of the invention may be executed by a computer system. FIG. 2 schematically illustrates an example computer system 200 according to an embodiment of the invention. The system 200 comprises a computer 202. The computer 202 itself comprises: a processor 204, a user input interface 206, a user output interface 208, a memory 210, an animation database 212, and a data interface 214, which are all linked together over one or more communication buses 216.

The processor 204 may be any data processing unit suitable for executing one or more computer programs in order to carry out an embodiment of the invention. The processor 204 may comprise a single data processing unit or multiple data processing units operating in parallel or in cooperation with each other.

The user input interface 206 is arranged to receive input from a user, or operator, of the system 200. This input may be received from one or more input devices of the system 200, such as a mouse 218 and/or a keyboard 220 that are connected to the User input interface 206. However, it will be appreciated that the user may provide input to the computer 202 via one or more additional or alternative input devices. The computer 202 may be arranged to store the input received from the input devices via the user input interface 206 in the memory 210 or to pass it straight to the processor 204 so that the processor 204 can respond to the user input accordingly.

The user output interface 208 is arrange to provide a graphical/visual output to a user, or operator, of the system 200. As such, the processor 204 may be arranged to instruct the user output interface 208 to form an image/video signal representing a desired graphical output, and to provide this signal to a monitor (or screen or display unit) 222 of the system 200 that is connected to the user output interface 208.

The memory 210 may be any memory or storage unit suitable for storing data and/or programs 211 (or software or instructions or code) forming part of an embodiment of the invention; The memory 210 may comprise volatile and/or non-volatile memory.

The database 212 may itself be stored in the memory 210, but in FIG. 2 it is shown being stored as an entity separate from the memory 210. The database 210 stores one or more animations 224 (or animation sequences), i.e. the database 210 stores the above-described data for one or more animations 224 for respective objects (or characters).

Finally, the data interface 214 may be any interface via which the computer 202 may receive (or input or download) data or provide (or output or upload) data, i.e. it may be any module via which data communication or transfer may take place. For example, the data interface 214 may provide functionality for the computer 202 to read data from and/or write data to one or more removable storage media 226 (such as a CD-ROM, a DVD-ROM, a flash memory device, etc.). Additionally, or alternatively, the data interface 214 may provide functionality for the computer 202 to download data from and/or upload data to one or more data communication networks (such as the Internet or a local area network).

It will be appreciated that the architecture of the system 200 illustrated in FIG. 2 and described above is merely exemplary and that other computer systems 200 with different architectures and additional and/or alternative components may be used in embodiments of the invention.

2) Screw Decomposition

Before moving on to describe in detail embodiments of the invention, it is worth describing first the so-called "screw decomposition".

2.1) Screw Decomposition Definition

It is well-known that any rigid motion (e.g. the motion of one joint at the end of one section of the object 100 with respect to the other joint at the other end of that section) can be fully defined by a rotation around an axis and a translation along that axis. This is known as a "screw decomposition", for that rigid motion.

The axis itself may be defined in a coordinate system by (i) the point x on the axis that is the closest to the origin; and (ii) a unit vector a in a direction along the axis.

The rotation around the axis may be defined by a rotation angle $\theta$.

The translation along the axis may be defined by a scalar value $\lambda$ such that the translation along the axis is $\lambda \hat{a}$.

The screw decomposition geometry for that rigid motion, as represented in that coordinate system, is then the set of $\{x, \hat{a}, \theta, \lambda\}$.

2.2) Calculating a Screw Decomposition from a Rotation Matrix and a Translation Vector Consider a particular movement in a coordinate system, where the movement is defined by a rotation (represented by a 3×3 rotation matrix R in that coordinate system) followed by a translation (represented by a 3×1 translation vector t in that coordinate system). We note that performing a translation first and then performing a rotation, can be represented by performing that same rotation first, followed by a corresponding different translation. It is possible to calculate the corresponding screw decomposition as follows.

(i) As the rotation is performed first, then $R\hat{a}=\hat{a}$ so that $(R-I)\hat{a}=0$, i.e. the vector $\hat{a}$ is a null vector of the matrix $(R-I)$. It is well known that, due to the properties of rotations, using the singular value decomposition it is possible to write $(R-I)=U\Sigma V^T$ for 3×3 matrices U, V and Σ, where $$\Sigma = \begin{pmatrix} \sigma & 0 & 0 \\ 0 & \sigma & 0 \\ 0 & 0 & 0 \end{pmatrix}$$

for some value σ. Then $\hat{a}$ is the last column of the matrix V.

(ii) The rotation angle θ can then be determined based on the following well-known identities:

$$2\cos\theta = \text{trace}(R - I) + 2$$
$$2\sin\theta \hat{a} = [R_{32} - R_{23}, R_{13} - R_{31}, R_{21} - R_{12}]$$
$$\text{and } \theta = \tan^{-1}\left(\frac{\sin\theta}{\cos\theta}\right),$$

where $R_{ij}$ is the element in the i-th row and j-th column of R.

(iii) To determine the point x on the axis of rotation, it is noted that $Rx+t=x+\lambda\hat{a}$, so that $(R-I)x=-t+\lambda\hat{a}$. Then, the point x can be determined using the equation $x=-(R-I)^+t+(R-I)^+\lambda\hat{a}$, where $(R-I)^+$ is the pseudo-inverse of the matrix $(R-I)$, namely $$(R - I)^+ = V \begin{pmatrix} 1/\sigma & 0 & 0 \\ 0 & 1/\sigma & 0 \\ 0 & 0 & 0 \end{pmatrix} U^T.$$

Due to the nature of the pseudo-inverse, $(R-I)^+\lambda\hat{a}=0$ since $\hat{a}$ is a hull vector of $(R-I)$. Hence, $x=-(R-I)^+t$.

(iv) Finally, the value of λ can be determined from the above equation $(R-I)x=-t+\lambda\hat{a}$, so that $\lambda=((R-I)x+t)\cdot\hat{a}$, where "·" represents a dot product (since $\hat{a}$ is a unit vector).

2.3) Calculating a Screw Decomposition from a Plurality of Pairs of Rotation Matrix and Translation Vector When there are a plurality (n) of motions, each defined in a given coordinate system by a corresponding rotation matrix $R_k$ followed by a corresponding translation vector $t_k$ (k=1 ... n), then a best fit screw decomposition approximating all of these motions can be determined as follows.

(i) Instead of determining the vector $\hat{a}$ as a hull vector of the matrix $(R-I)$ as in section 2.2(i) above, the vector $\hat{a}$ may be determined as a null vector of the matrix $$B = \begin{bmatrix} R_1 - I \\ R_2 - I \\ \vdots \\ R_n - I \end{bmatrix}.$$

In this case, the singular value decomposition will not necessarily give the above matrix Σ as $$\begin{pmatrix} \sigma & 0 & 0 \\ 0 & \sigma & 0 \\ 0 & 0 & 0 \end{pmatrix}.$$

Instead, this matrix may be $$\begin{pmatrix} \sigma_1 & 0 & 0 \\ 0 & \sigma_2 & 0 \\ 0 & 0 & \sigma_3 \end{pmatrix}$$

for some values $\sigma_1$, $\sigma_2$ and $\sigma_3$. In this case, the matrix $$\Sigma' = \begin{pmatrix} (\sigma_1 + \sigma_2)/2 & 0 & 0 \\ 0 & (\sigma_1 + \sigma_2)/2 & 0 \\ 0 & 0 & 0 \end{pmatrix}$$

is used instead of the matrix Σ and appropriate matrices U and V can then be ascertained accordingly so that $B=U\Sigma'V^T$. Then $\hat{a}$ is the last column of the matrix V.

(ii) Whereas for the case of a single rotation matrix R and single translation vector t, the point x can be determined as $x=-(R-I)^+t$, with the plurality rotation matrices $R_k$ and corresponding translation vectors $t_k$ (k=1 ... n), the point x can be determined as $$x = -\begin{bmatrix} R_1 - I \\ R_2 - I \\ \vdots \\ R_n - I \end{bmatrix}^+ \begin{bmatrix} t_1 \\ t_2 \\ \vdots \\ t_n \end{bmatrix}.$$

(iii) In the embodiments described below, it is not necessary to calculate a rotation angle θ or a translation value λ from a set of multiple rotation matrices $R_k$ and corresponding translation vectors $t_k$.

3) Generating a Description (or a Template) for an Event Type

As mentioned above, some embodiments of the invention are concerned with how to define a particular type of event, so that the occurrence of events of that type may then be detected in an animation. The nature of an event type will be explained in more detail below, following which will be described how a description of an event type, which shall be referred to as ah event template, is actually formed according to embodiments of the invention.

3.1) Event Types and Event Templates

In summary, an event of a particular event type:

(a) involves one or more specified object parts of the object 100;

(b) involves a sequence of two or more event phases, where these event phases occur during the event of that event type such that;

(c) for each of the two or more event phases, the respective movements of the one or more specified object parts of the object 100 during that event phase are each constrained according to a constraint type associated with that event, phase.

The event type description (or event template) therefore specifies (i) one or more of the object parts; and (ii) a sequence of two or more event phases that occur during an event of that event type such that, for each event phase, the respective movements of the one or more specified object parts during that event phase are each constrained according to a constraint type associated with that event phase.

Firstly, the specified one or more object parts are those object parts which a user (who has defined the event type and created the event template) considers to be the object parts, out of all the object parts for the object 100, whose movement is involved in, and characterises, an event of that event type.

For example, when the object 100 represents a person or an animal, then an event type may be a "foot fall" event that occurs when that person or animal places a foot on the ground of (or a surface within) the virtual environment during an animation of that person or animal walking, running, jogging, etc. For example, for an object 100 simulating a human person, there may be a "left foot fall" event that occurs when that person is walking and that person places his left foot on the ground, and similarly there may be a "right foot fall" event that occurs when that person is walking and that person places his right foot on the ground. For an event of a "left foot fall" event type, the user could decide and specify that the object parts involved in that event are an ankle joint and a toe joint of the left foot of that person. Similarly, for an event of a "right foot fall" event type, the user could decide and specify that the object parts involved iii that event are an ankle joint and a toe joint of the right foot of that person. Object parts for other event types may be specified analogously. For example, a user may decide that a "right hand wave" event type involves a wrist joint and finger joints of the right hand of the person object 100.

An event phase (or as motion phase) is a period, or a section, of the animation that occurs during an event of the event type. The event phase is a contiguous period, and hence is a plurality of consecutive frames from the entire sequence of frames of the animation. When combined, the two or more event phases in the sequence of two or more event phases may themselves together form a contiguous period within the animation, but this need not necessarily be the case—for example, during an event, there may be a period of one or more frames between two event phases, where these frames are not themselves part of an event phase.

In specifying the event phases for an event type, the event template typically specifies timing data that indicates, for each event phase, when that event phase occurs during an event of the event type. For example, a first event phase for the event may start at a first frame during that event. The timing data for the sequence of event phases may then specify when, relative to that first event phase, the subsequent event phase(s) occur (e.g. a certain number of frames after the start of the first event phase). Alternatively, for the $(i+1)^{th}$ event phase ($i \geq 1$) the timing data may specify when that event phase occurs as a number of frames after the end (i.e the last frame) of the $i^{th}$ event phase. The timing data may specify a duration for each event phase (e.g. in terms of a number of frames for that event phase or in terms of a start frame number and an end frame number). It will be appreciated that embodiments of the invention may use alternative methods to specify in the event template the timings and/or durations of event phases for an event.

The event template specifies for each event phase a respective "constraint type" associated with that event phase. The constraint type imposes a constraint on the motion of the specified one or more object parts throughout the duration of that event phase, and may therefore be considered to be a corresponding motion type. The motion of the one or more specified object parts during an event phase is constrained (in accordance with the constraint type) such that at least one degree of freedom is constrained for the respective movements of the specified one or more object parts (the constrained degree(s) of freedom being common to each of the object parts).

For example, the constraint type for an event phase may specify that, during that event phase, all of the specified one or more object parts undergo no translation in one or more respective directions. Additionally or alternatively, the constraint type for an event phase may specify that, during that event phase, all of the specified one or more object parts undergo no rotation in one or more respective directions. As such, the constraint type for an event phase may specify one of: (a) a constraint (known as an "identity constraint") specifying that each of the specified one or more object parts remains stationary (in the virtual environment) during that event phase; (b) a constraint (known as a "hinge constraint") specifying that each of the specified one or more object parts rotates about a respective fixed axis (fixed in the virtual environment) during that event phase, but with no translation in the direction of that axis; or (c) a constraint (known as a "point constraint" or a "pivot constraint") specifying that each of the specified one or more object parts pivots or rotates about a respective fixed point (fixed in the virtual environment) during that event phase. An event phase with an identity constraint shall be referred to as a stationary event phase; an event phase with a hinge constraint shall be referred to as a hinge event phase; an event phase with a point constraint shall be referred to as a pivot event phase.

Whilst embodiments of the invention will be described: using the above three types of constraint, it will be appreciated that other constraint types may be used in other embodiments of the invention. For example:

(d) a so-called "space constraint" may simply specify that each of the one or more object parts may undergo translation and rotation, but may not undergo scaling or shearing, i.e. a rigid motion transform for the set of one-or more object parts;

(e) a so-called "plane constraint" may constrain the movement of each object part that is located on a respective fixed plane to remain on that respective fixed plane;

(f) a so-called "line constraint" may specify that that each of the specified one or more object parts rotates about a respective fixed axis (fixed in the virtual environment) during that event phase—the hinge constraint is a specific form of a line constraint in that the hinge constraint further requires no translation of the object parts in the direction of the rotation axis, whilst this is not a requirement for a line constraint;

(g) a so-called "pure translation constraint", which is a space constraint further specifying that each of the object parts undergoes no rotation, but may undergo translation;

(h) a so-called "spin constraint", which is a space constraint further specifying that each of the object parts rotates about an axis which has a fixed direction, but the location of that axis in the environment may change;

(i) a so-called "screw constraint", which is a spin constraint further specifying that the translation of the one or more object parts is constrained to be along the axis of rotation, i.e. under a screw constraint, the one or more object parts rotate about a fixed axis and may have a translation in the direction of the fixed axis.

FIG. 3 schematically illustrates an example event template 300 according to an embodiment of the invention. This example event template 300 represents a "turning footstep" event type. A "turning footstep" event occurs when a person object 100 takes a footstep and changes direction at the end of that footstep.

As can be seen, the object parts involved in this event are an ankle joint and a toe joint (representing parts of a foot of an object 100). These two object parts are therefore specified by this event template 300.

This event type has three event phases specified by this event template 300. The first event phase to occur (with phase ID=1) has been called a "heel strike" and is intended to represent the portion of the footstep when the heel of the foot hits the ground and the foot then rotates around the (fixed) heel. The next event phase to occur (with phase ID=2) has been called a "foot plant" and is intended to represent the portion of the footstep when the whole foot has been placed on the ground and remains stationary. The next event phase to occur (with phase ID=3) has been called a "toe off" and is intended to represent the final portion of the footstep when the person pushes off from the footstep by rotating about the ends the toes of the foot. As this is a "turning footstep" event type, the rotation for this event phase is a pivoting motion about a fixed point. If the event were a "non-turning footstep" event type instead, then the rotation for this event phase would have been a hinging motion about a fixed line.

Thus, the constraint type for the heel strike event phase is a hinge constraint and that event phase is a hinge event phase; the constraint type for the foot plant event phase is an identity constraint and that event phase is a stationary event phase; and the constraint type for the toe off event phase is a point constraint and that event phase is a pivot event phase.

For each event phase, the event template 300 identifies when that event phase occurs (in this case, directly after a preceding event phase) and stores the duration of that event phase in terms of a number of frames.

For each event phase and each object part, the template 300 stores one or more motion parameters that characterise movement of that object part during that event phase. In the example template 300 of FIG. 3, these parameters include:
  Data representing geometry for the movement of that object part. This may be represented by storing in the event template, for each event phase and each object part, respective data identifying (i) a point x; and (ii) a unit vector â. When the constraint type is a hinge constraint, the point x may represent a point on the axis of rotation for that constraint, e.g. a point on the axis that is nearest to an origin in a coordinate space, whilst the unit vector â may be a unit vector along that axis of rotation. When the constraint type is an identity constraint, both the point x and the unit vector â may be set to 0, as no motion is meant to occur during that event phase. When the constraint type is a point constraint, the point x may represent a point about which the object part pivots, whilst the unit vector â may be set to 0 as there is no axis of rotation for such a constraint. Indeed, storing the point x and the unit vector â in this way, and setting them to be 0 as appropriate (as described above) may be used to specify the constraint type itself, i.e. the template 300 need not explicitly have a field for each event phase identifying the event type of that event phase.
  Statistics data, i.e. data representing a degree of variance of, or uncertainty in, the motion (its geometry and/or dynamics) of that object part during that event phase. The statistics data shall be described in more detail later.

It will be appreciated that embodiments of the invention may involve event templates similar to the event template 300 of FIG. 3, potentially with different numbers of event phases, possibly with additional and/or alternative combinations of constraint types, and possibly with alternative durations and/or geometries and/or statistics.

3.2) Generating an Event Template for an Event Type

Figure 4:
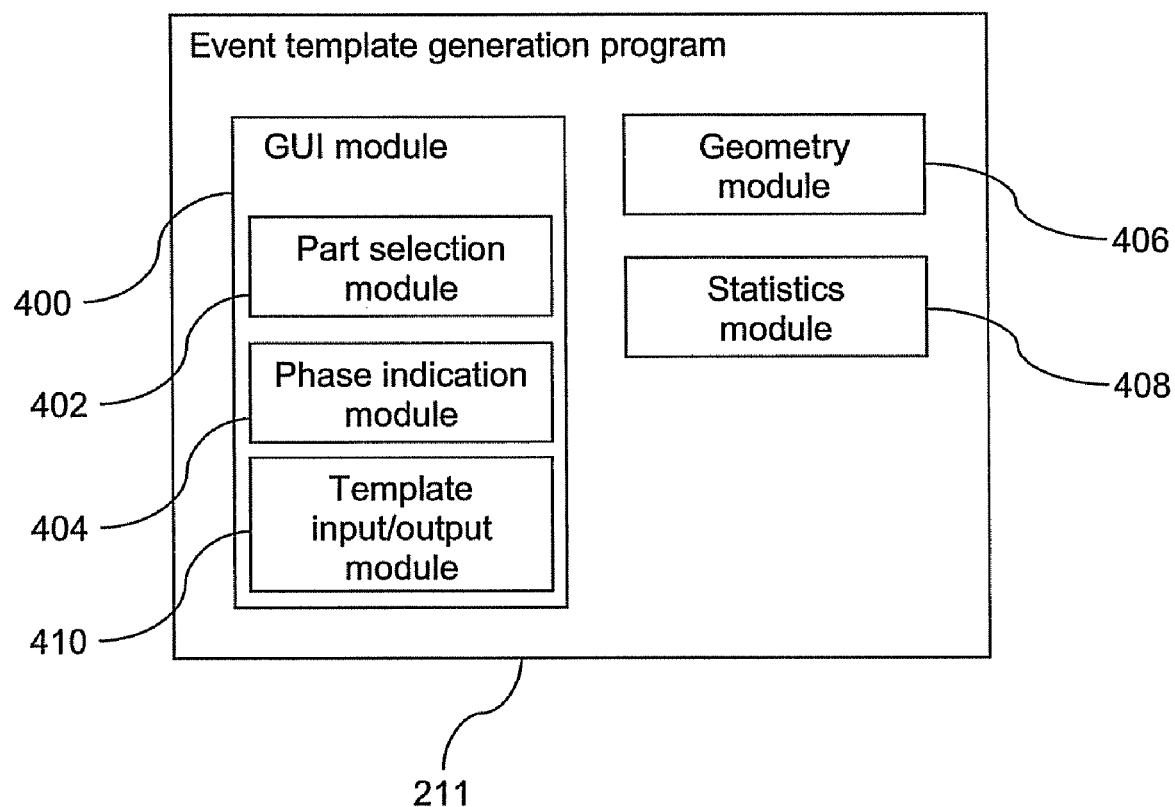
FIG. 4 schematically illustrates an example computer program according to an embodiment of the invention for generating an event template to describe an event type.

FIG. 4 schematically illustrates an example computer program 211 according to an embodiment of the invention for generating an event template to describe an event type. The computer program 211 may be, for example, one of the computer programs 211 stored in the memory 210 of the computer 202 of FIG. 2 and may be executed by the processor 204 of the computer 202 to carry out an embodiment of the invention.

The computer program 211 comprises a number of modules or program components, including: a graphical user interface (GUI) module 400, a geometry module 406 and a statistics module 408. These components may themselves be in the form of one or more separate computer programs or may be functions or routines within a single computer program 211. The GUI module 400 itself comprises a number of modules or program components, including: a part selection module 402, a phase indication module 404 and a template input/output module 410.

Figure 5:
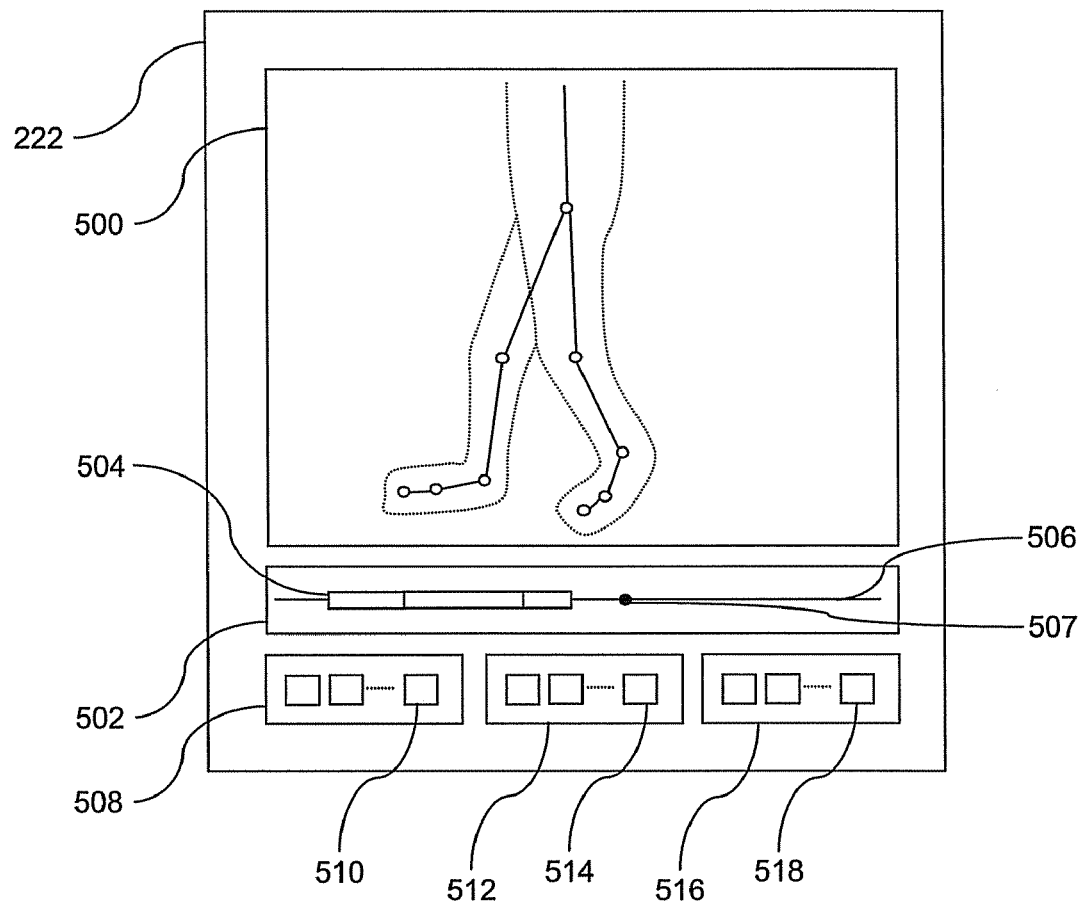
FIG. 5 schematically illustrates an example graphical user interface with which a user of the system of FIG. 2 can provide input to that system.

The GUI module 400 is responsible for presenting to a user of the system 200 a visual interface with which that user can interact so as to provide, input from the user to the system 200. An example graphical interface is illustrated in FIG. 5 and shall be described shortly. In particular, though, the part selection module 402 contains functionality (or logic or code) to allow the user to identify or specify the one or more joints (object parts) that the user considers to be involved in an event of a particular event type, whilst the phase indication module 404 contains functionality to allow the user to specify, indicate and determine the two or more event phases for that event type. The template input/output module 410 provides functionality to enable loading and saving of event templates. An event template may be stored, for example, in the memory 210, on a storage medium 226, or at a location accessible via the network 228. Similarly, an event template may be loaded from, for example, the memory 210, a storage medium 226, or a location accessible via the network 228.

The geometry module 406 contains functionality to automatically determine, for each event phase and each joint, the respective geometry data that represents the constrained motion of that joint during that event phase (such as the geometry data mentioned above in reference to the event template 300 of FIG. 3).

The statistics module 408 contains functionality to automatically determine, for each event phase and each joint, the respective statistics data that represents a degree of variability of (or uncertainty in) the constrained motion of that joint during that event phase (such as the statistics data mentioned above in reference to the event template 300 of FIG. 3).

FIG. 5 schematically illustrates an example GUI with which a user of the system 200 can provide input to the system 200. In this way, the user may provide input to the system 200 to generate a definition of an event type (i.e. generate an event template). The processor 204 executes the GUI module 400 so as to display, and provide the functionality of, the GUI of FIG. 5.

The GUI provides an animation display window 500 for displaying images representing the animation. The display (or play-out or play-back or viewing or browsing or scrubbing) of the animation may be controlled by one or more controls 510 that are provided in a display control area 508 of the GUI. For example, the controls 510 in the display control area 508 may include: a play control, a pause control, a control to advance the animation by a single frame, a control to rewind the animation by a single frame, a control to zoom in or zoom out of the animation, a fast forwards control, a rewind control, etc. Such controls 510 and their ability to control the display of the animation in the display window 500 are well-known and shall therefore not be described in more detail herein.

The GUI also provides a timeline area 502 that displays a timeline 506 for the animation. The timeline 506 represents the entire duration of the animation (i.e. the entire length of the sequence of frames for the animation). The GUI may display a marker 507 on the timeline 506 to represent the position within the animation at which the frame that is currently being displayed in the display window 500 is located. The GUI may also display one or more phase indicators 504 on the timeline 506 to indicate the location and duration in the animation of the (or any) currently specified/identified event phases.

The GUI also provides an event type generation area 512 that contains one or more event type generation controls 514. In particular:

- The part selection module 402 executed by the processor 204 provides ah object part identification control that allows the user to specify the one or more object parts involved in an event of the event type being defined. For example, the object part identification control may be a button which the user can select. In response to the selection of this button, the part selection module 402 allows the user to identify and select one or more object parts—for example, the part selection module 402 may display to the user a list of all of the object parts of the object 100 and may allow the user to select one or more of the entries in that list so as to specify the relevant object parts for this event type.

- The phase indication module 404 executed by the processor 204 provides one or more phase indication controls that allow the user to specify the two or more event phases in the sequence of event phases for this event type. For example, the phase indication module 404 may provide a phase indication control that allows the user to specify that the frame currently displayed in the display window 500 is the start of an event phase and a phase indication control that allows the user to specify that the frame currently displayed in the display window 500 is the end of that event phase. The phase indication module 404 may also provide a phase duration control that allows the user to specify the duration (or length or number of frames) for the current event phase. The phase indication module 404 may also provide a phase indication control that allows the user to specify the particular constraint type to associate with a current event phase, for example by displaying to the user a list of all of the possible constraint types and allowing the user, to select one of the entries in that list so as to specify the constraint type to associate with the current event phase. The phase indication module 404 may allow the user to specify the current event phase by, for example, allowing the user to select one of the phase indicators 504 so as to specify the corresponding event phase.

- The GUI may provide a template generation control 514 which, when selected by the user, causes the event template generation program 211 to generate an event template in accordance with the object parts and event phases specified by the user.

The GUI may allow the user to select one of the phase indicators 504 and drag that phase indicator 504 along the timeline 506 so as to allow the user to adjust (or re-specify) the location (or frames) within the animation at which the user considers that event phase to occur. Additionally, or alternatively, the GUI may allow the user to select a part of a phase indicator 504 (e.g. a left edge or a right edge, of the phase indicator 504) and move that part along the timeline 506. In this way, the user may adjust (or re-specify) the starting frame, ending frame or duration of the event phase associated with that phase indicator 504.

The GUI also provides, by executing the template input/output module 410, an event template input/output area 516 that contains one or more event template input/output controls 518. These event template input/output controls 518 may allow the user to open (or load) a previously defined event template (for example, to allow the user to modify or update that event template or to use that loaded, event template as the basis for defining a new event template). These event template input/output controls 518 may allow the user to generate the relevant data (geometry data and statistics data) for an event template based on the currently specified object parts and event phases. These event template input/output controls 518 may allow the user to save (or store) that generated data for the current event template.

Figure 6:
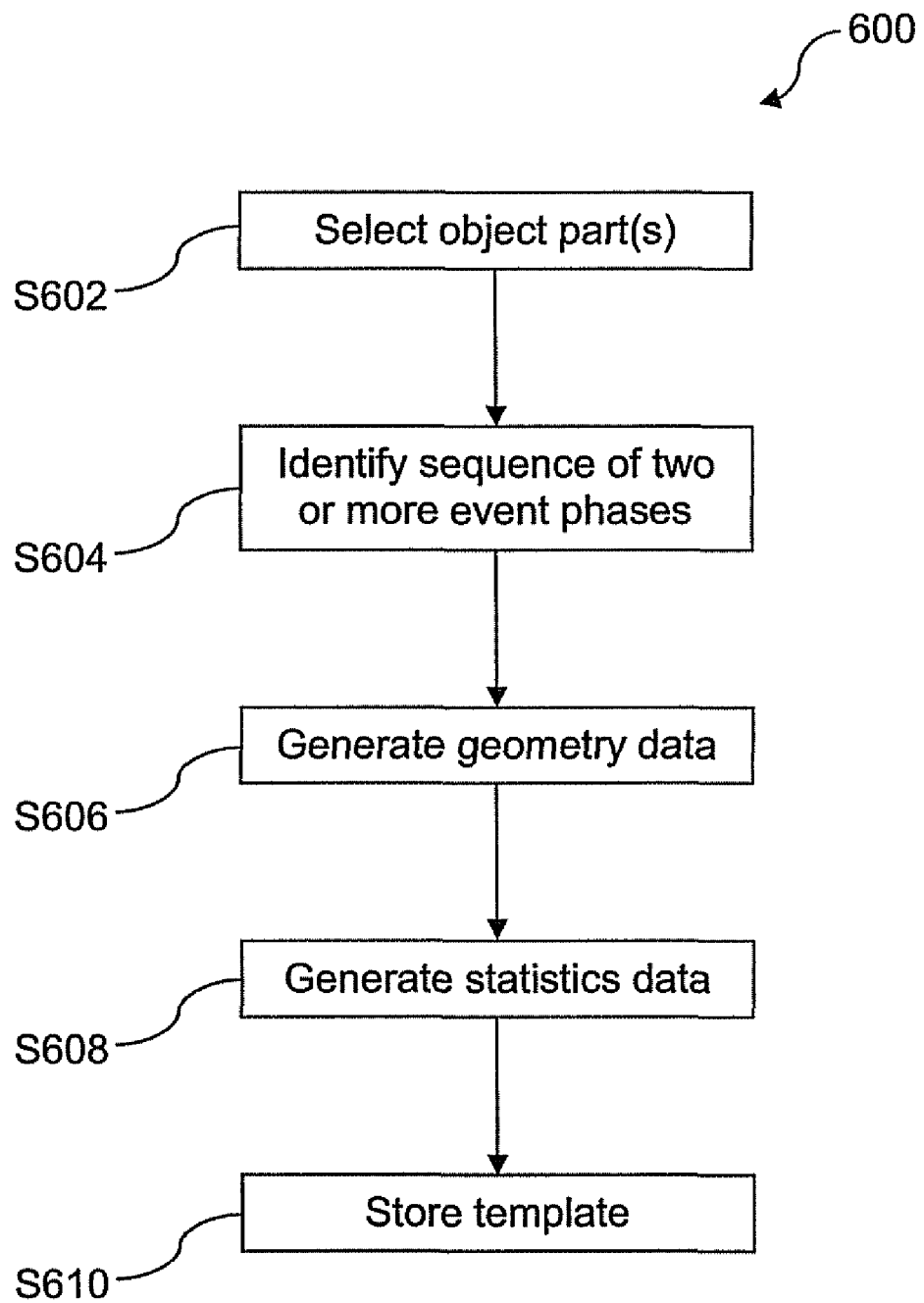
FIG. 6 is a flowchart schematically illustrating a method for generating an event template according to an embodiment of the invention.

FIG. 6 is a flowchart schematically illustrating a method 600 for generating, an event template according to an embodiment of the invention. In essence, the method 600 transforms the inputs of the user (namely the specifications made by the user of the object parts and the event phases) and the animation data of the animation being considered, into an event template.

At a step S602, the user specifies (i.e. selects or indicates), through the functionality of the part selection module 402, the one or more object parts that are involved in an event of the current event type. This may be achieved using the GUI of FIG. 5, as described above.

At a step S604, the user specifies (i.e. selects or indicates), through the functionality of the phase indication module 404, the sequence of two or more event phases for an event of the current event type, including specifying the timings and constraint types associated with those event phases. The user performs this in relation to the occurrence of an event of the specified event type (as perceived by the user), so that the indicated event phases are timed and occur during the animation at that particular occurrence of the event. This may be achieved using the GUI of FIG. 5, as described above.

Once the various object parts have been specified and the various event phases have been indicated, then at a step S606, the geometry module 406 generates, for each event phase and each object part, the respective geometry data that specifies the nature of the constrained motion of that object part that occurs during that event phase, in accordance with that constraint type. This shall be described in more detail, shortly.

Next, at a step S608, the statistics module 408 generates, for each event phase and each object part, respective statistics data so as to specify the variations of the constrained motion of that object part that occurs during that event phase. This shall be described in more detail shortly.

Finally, at a step S610, the user may interact with the GUI so as to cause the template input/output module 410 to generate the event template. The event template comprises data specifying the one or more object parts specified at the step S602; data specifying the sequence of two or more event phases and their respective associated constraint types as specified at the step S604; possibly also the geometry data generated at the step S606; and possibly also the statistics data generated at the step S608. The template input/output module 410 may store, or save, the generated event template.

At the step S610, the template input/output module 410 may store the duration of each event phase in the output event template. The duration of a particular event phase may be calculated as an average of the number of frames for that event phase from each of the one or more identified occurrences of an event. This average may, for example, be a weighted average, where the weighting is biased towards the event occurrences that more closely match the statistics and/or geometry specified in the event template. However, it will be appreciated that embodiments of the invention may use other methods to determine the duration of a specified event phase.

It will be appreciated that the steps S602 and S604 need not be performed in the order illustrated in FIG. 6, but may be performed in any order and may, indeed be performed in an interleaved manner (e.g. the user could specify some of the object parts, then move on to indicating some of the event phases, then return to specifying some more object parts, and so on). Similarly, it will be appreciated that the steps S606 and S608 need not be performed in the order illustrated in FIG. 6, but may be performed in any order. Furthermore, it will be appreciated that the steps S606 and S608 need not be performed only when the user has made a final selection of the object parts at the step S602 and has made a final indication of the event phases for the event type at the step S604, but may, instead, be performed every time the user changes or modifies either the specified object parts or indicated event phases (so that up-to-date geometry data and statistics data is maintained at all times).

Figure 7:
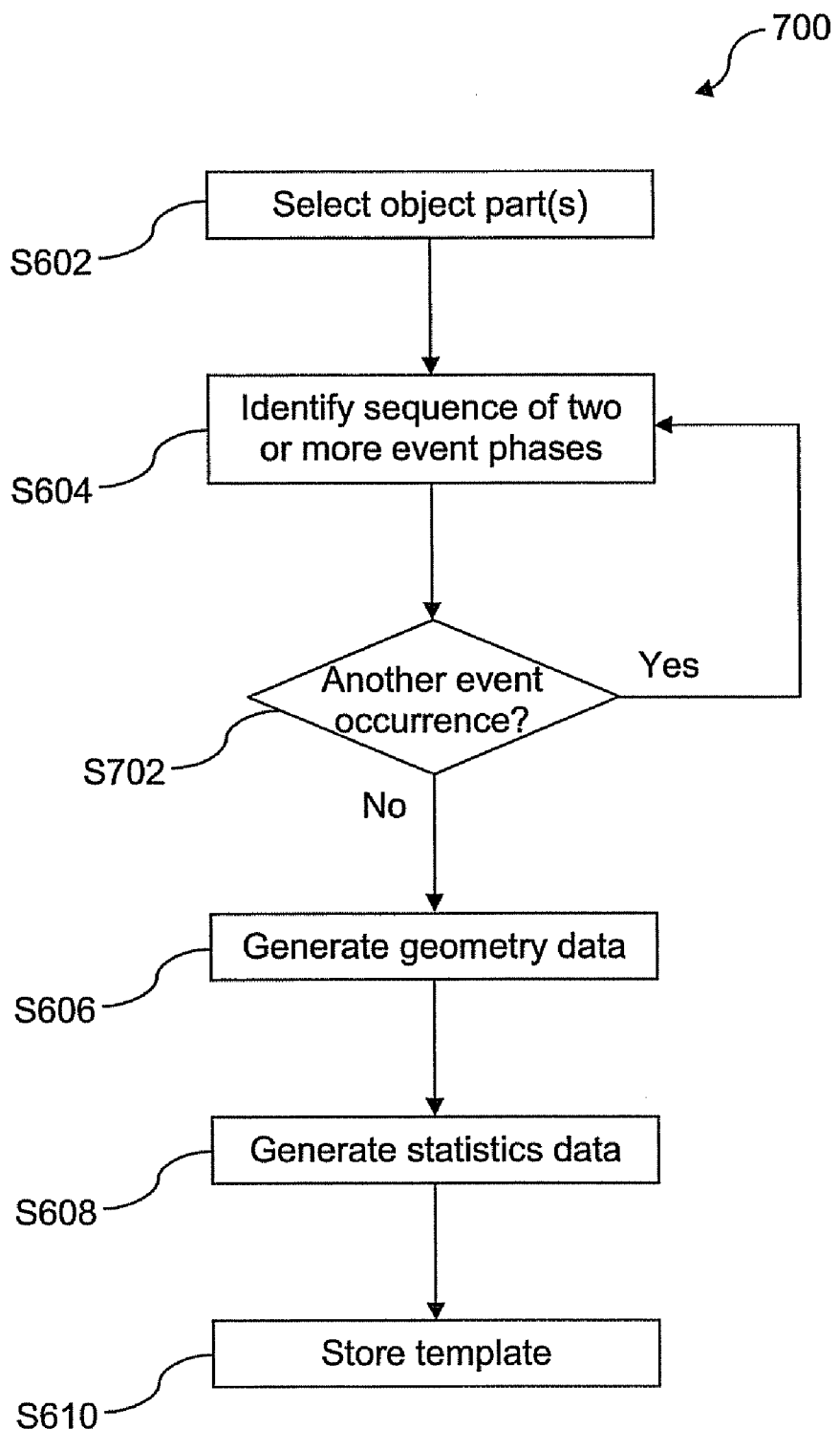
FIG. 7 is a flowchart schematically illustrating another method for generating an event template according to an embodiment of the invention.

FIG. 7 is a flowchart schematically illustrating another method 700 for generating an event template according to an embodiment of the invention. The method 700 of FIG. 7 is the same as the method 600 of FIG. 6, except for the inclusion of an additional step S702. Hence, for ease of explanation, the steps that the method 700 of FIG. 7 and the method 600 of FIG. 6 have in common shall not be described again.

The additional step S702 occurs after the user has indicated the sequence of two or more event phases for a particular occurrence of an event of the event type. At the step S702, the user may proceed to identify another occurrence of an event of the event type, with processing returning to the step S604 at which the user indicates the sequence of two or more event phases for that further event occurrence. In this way, the user may specify the sequence of two or more event phases that characterise ah event of the event type by identifying a plurality of events of the event type in the animation and specifying when the event phases occur in each of those events. This means that a more representative event template may be generated as the geometry data and the statistics data for the event template may be based on more frames of the animation and different variations or instances of events of that event type. Essentially, the corresponding event phases from the multiple identified instances of an event of the event type are treated by the geometry module 406 and statistics module 408 (see later) as a single event phase (e.g. as a concatenation of the multiple corresponding event phases).

If no more event occurrences are to be identified, then processing moves from the step S702 to the step S606.

3.2.1) Generating the Geometry Data

At the step S606 of FIGS. 6 and 7, the geometry module 406 generates geometry data for inclusion in the event template. The geometry module 406 generates respective geometry data for each joint at each event phase. The geometry data for a particular joint and a particular event phase is data characterising the constrained motion of that joint during that event phase (i.e. the movement of the joint as constrained by the constraint type associated with that event phase).

On a frame-by-frame basis, the movement of a joint at a frame can be represented by a rotation (represented by a rotation matrix R) followed by a translation (represented by a translation vector t). In particular, for an arbitrary frame of the animation, a local coordinate system can be defined for a joint in which that joint is located at and oriented in a predetermined position within that local coordinate system. For example, the local coordinate system for a joint may have its origin at the location of the joint and its x-axis in the direction of orientation of that joint (i.e. an object section extending out from that joint to a child of that joint lies along the x-axis in that local coordinate system). However, it will be appreciated that other local coordinate systems may be used.

Then, the movement for that joint for the $k^{th}$ frame may be calculated by determining where the location of that joint for the $k^{th}$ frame is positioned in the local coordinate system of that joint for the $(k-1)^{th}$ frame. It is then well-known how to obtain the corresponding rotation matrix $R_k$ and a translation vector $t_k$ in that local coordinate system to describe the motion for that joint at the $k^{th}$ frame.

It will be appreciated that, in a similar way, the movement for a joint for the $k^{th}$ frame may be calculated by determining where the location of that joint for the $k^{th}$ frame is positioned in the local coordinate system of that joint for the $(k+1)^{th}$ frame. Again, it is then well-known how to obtain the corresponding rotation matrix $R_k$ and a translation vector $t_k$ in that local coordinate system to describe the motion for that joint at the $k^{th}$ frame.

It also will be appreciated that, in a similar way, the movement for a joint for the $k^{th}$ frame may be calculated by determining where the location of that joint for the $(k-1)^{th}$ frame is positioned in the local coordinate system of that joint for the $k^{th}$ frame. Again, it is then well-known how to obtain the corresponding rotation matrix $R_k$ and a translation vector $t_k$ in that local coordinate system to describe the motion for that joint at the $k^{th}$ frame.

It also will be appreciated that, in a similar way, the movement for a joint for the $k^{th}$ frame may be calculated by determining where the location of that joint for the $(k+1)^{th}$ frame is positioned in the local coordinate system of that joint for the $k^{th}$ frame. Again, it is then well-known how to obtain the corresponding rotation matrix $R_k$ and a translation vector $t_k$ in that local coordinate system to describe the motion for that joint at the $k^{th}$ frame.

The rotation matrix R and translation vector t may then be represented in the screw decomposition (as described in section 2.2 above).

The above-described motion for a joint at a single frame in the animation shall be referred to as the "one-frame motion" for that joint. The one-frame motion for a joint, and its associated screw decomposition geometry data, may be ascertained as outlined above.

Similarly, for an event phase, the movement of a joint across the duration of the event phase may be represented by using, for each movement from one frame of that event phase to a subsequent frame, a respective rotation matrix R and translation vector t for that movement. Thus, one or more pairs of rotation matrices $R_k$ and translation vectors $t_k$ may be determined to define the respective one-frame motions of the joint at each of the frames of the entire event phase. These pairs may then be represented in a single best fit screw decomposition (as described in section 2:3 above), As such, the motion for a joint during an event phase may be represented by screw decomposition parameters x and â;

The geometry module 406 generates geometry data for a given joint and a given event phase, where that geometry data comprises values for x and â to represent the motion of that joint during that event phase. In particular:

For a stationary event phase, it is intended that the specified one or more joints do not move, in the environment during that event phase. Hence, the geometry module

406 sets x=0 and â=0 for each joint for that stationary event phase to represent that there should be no motion.

For a hinge event phase, it is intended that the specified one or more joints each rotate about their own respective fixed axes (which may or may not be coincident with each other) during that event phase. Hence, the geometry module 406 determines, for each joint, corresponding values for x and â that represent the axis of rotation for that joint during the hinge event phase. The geometry module 406 does this by determining the above-described one or more pairs of rotation matrices $R_k$ and translation vectors $t_k$ that define the respective one-frame motions of that joint at each frame of the entire hinge event phase, and then determining a screw decomposition using these pairs (as described above in section 2.3) to calculate x and â for that joint.

For a pivot event phase, it is intended that the specified one or more joints each pivot about their own respective fixed points (which may or may not be coincident with each other) during that event phase. We note that the frame-to-frame movement of the joint during a pivot event phase appears to be a rotation about an axis—however, the point constraint is distinguished from a hinge constraint in that the axes of rotation for the point constraint change from frame to frame, whereas the axes of rotation for the hinge constraint should be constant between frames.

The geometry module 406 reflects this by setting â=0 for each joint for that event phase to represent that there should be no particular axis of rotation.

The geometry module 406 determines, for each joint, the value for x for that joint as the corresponding point of pivot (which should be the intersection of the various different frame-to-frame axes of rotation for the event phase). The geometry module 406 does this by determining the above-described one or more pairs of rotation matrices $R_k$ and translation vectors $t_k$ that define the respective one-frame motions of that joint at each frame of the entire pivot event phase, and then determining a screw decomposition, or at least a part thereof, to calculate x, e.g. by using the calculation in section 2.2(iii) or section 2.3(ii) above.

Thus, the geometry data generated by the geometry module 406:

(a) for a stationary event phase, specifies there to be no axis of rotation or point of pivot by setting x=0 and â=0 for each joint for that event phase;

(b) for a hinge event phase, specifies the respective axes of rotation for each joint by determining x and a for each joint for that event phase; and (c) for a pivot event phase, specifies the respective points about which each joint pivots by setting â=0 and by determining a respective x for each joint for that event phase.

Note that the values for x and â for a joint are given in the local coordinate space of that joint.

It will be appreciated that other embodiments of the invention may use other methods to generate geometry data that specifies the geometry of the constrained motion of a joint for an event phase.

3.2.2) Generating the Statistics Data

At the step S608 of FIGS. 6 and 7, the statistics module 408 generates statistics data for inclusion in the event template. The statistics module 408 generates respective statistics data for each joint at each event phase. The statistics data for a particular joint and a particular event phase is data characterising a degree of variation of (or uncertainty in) the motion (or the geometry of the motion) of that joint during that event phase (i.e. how much that movement of the joint varies from an expected movement of the joint as constrained by the constraint type associated with that event phase).

For each event phase, and each joint specified for the event type, the statistics module 408 calculates one or more of the following:

$\sigma_\theta^2$: which represents the variation of the angle of rotation θ during that event phase;

$\sigma_x^2$: which represents the variation of the point x during that event phase; and $\sigma_a^2$: which represents the variation of the unit vector â during that event phase, i.e. the variation in the orientation or direction of that axis during that event phase.

For a stationary event phase, the geometry module 406 sets the values for x and â to 0 and hence, for that event phase, the statistics module 408 calculates for each joint a respective value of $\sigma_\theta^2$, but not values for $\sigma_x^2$ or $\sigma_a^2$.

For a hinge event phase, the geometry module 406 determines respective values for x and â for each joint and hence, for that event phase, the statistics module 408 calculates for each joint a respective value of $\sigma_\theta^2$, $\sigma_x^2$ and $\sigma_a^2$.

For a pivot event phase, the geometry module 406 sets the values for â to 0 but calculates a respective value of x for each joint and hence, for that event phase, the statistics module 408 calculates for each joint a respective value of $\sigma_\theta^2$ and $\sigma_x^2$, but not a value for $\sigma_a^2$.

The above is illustrated in the example event template 300 of FIG. 3.

The statistics module 408 calculates these variances in the manner described below.

For the $k^{th}$ frame of an event phase and for one of the joints specified for the event template, the statistics module 408 is arranged to determine the rotation matrix $R_k$ and translation vector $t^k$ for the one-frame motion of that joint at the $k^{th}$ frame in the manner described above for the geometry module 406. The statistics module 408 is arranged to determine the screw decomposition corresponding to this rotation matrix $R_k$ and translation vector $t_k$ using the method described above in section 2.2, to arrive at screw decomposition geometry parameters $x_k$, $â_k$, $\theta_k$ and $\lambda_k$ for that one-frame motion.

Alternatively, the statistics module 408 may reuse the results of the calculations performed by the geometry module 406 to arrive at the values for $x_k$, $â_k$, $\theta_k$ and $\lambda_k$ for that $k^{th}$ frame of that event phase for that joint.

As described above, the geometry module 406 calculates best fit values for x and â to represent the movement of that joint over the entire event phase.

The statistics module 408 is arranged to make use of one or more distance measures, which provide a measure of the distance, or difference (i.e; a comparison), in the geometry ($x_k$, $â_k$, $\theta_k$ and $\lambda_k$) for a single one-frame motion (i.e. at the $k^{th}$ frame in an event phase) and the geometry (x and â) for a whole event phase. The statistics module 408 uses these distance measures to calculate the above variances $\sigma_\theta^2$, $\sigma_x^2$ and $\sigma_a^2$.

In particular, the statistics module 408 is arranged to use or calculate the following distance measures in the following scenarios:

(DM-a) If frame k is a frame from a stationary phase (or is suspected as being from a stationary phase), then when comparing its one-frame motion geometry against the geometry for a stationary event phase, the distance measure used is $d_\theta = |\theta_k|$, measuring a difference in the rotation angle θ against ah expected rotation angle of 0.

(DM-b) If frame k is a frame from a stationary phase (or is suspected as being from a stationary phase), then when comparing its one-frame motion geometry against the geometry for a hinge event phase, the distance measure used is $d_\theta=|\theta_k|$, measuring a difference in the rotation angle θ against an expected rotation angle of 0.

(DM-c) If frame k is a frame from a stationary phase (or is suspected as being from a stationary phase), then when comparing its one-frame motion geometry against the geometry for a pivot event phase, the distance measure used is $d_\theta=|\theta_k|$, measuring a difference in the rotation angle θ against an expected rotation angle of 0.

(DM-d) If frame k is a frame from a hinge phase (or is suspected as being from a hinge phase), then when comparing its one-frame motion geometry against the geometry for a stationary event phase, the distance measure used is $d_\theta=|\theta_k|$, measuring a difference in the rotation angle θ against an expected rotation angle of 0.

(DM-e) If frame k is a frame from a hinge phase (or is suspected as being from a hinge phase), then when comparing its one-frame motion geometry against the geometry for a hinge event phase, the distance measures used are $d_x=\|x_k-x\|$ and $d_a=1-|\hat{a}_k \cdot \hat{a}|$, measuring a difference in the positions and orientations of the respective axes of rotation.

(DM-f) If frame k is a frame from a hinge phase (or is suspected as being from a hinge phase), then when comparing its one-frame motion geometry against the geometry for a pivot event phase, the distance measure used is $d_x=\|(x_k-\mu\hat{a}_k)-x\|$ where $\mu=(x-x_k)\cdot\hat{a}_k$ so that $d_x$ measures the shortest distance between the pivot point x of the pivot event phase and the axis of rotation for the hinge phase at frame k.

As the one-frame motion of a frame of a pivot phase appears to be a rotation about an axis, and it is only when three frames are analysed that it is possible to distinguish between a pivot event phase and a hinge event phase, the distance measures DM-e and DM-f above may also be used analogously when frame, k is a frame from a pivot phase (or is suspected as being from a pivot phase).

For each event phase and each joint, the statistics module 408 calculates the relevant distance values for each of the one-frame motions of that joint for each frame of that event phase. If more than one occurrence of an event has been identified by the user (as in the method 700 of FIG. 7), the statistics module calculates the relevant distance values for each of the one-frame motions of that joint for each frame of that event phase.

For this, the type of one-frame motion will actually match the actual constraint type for the event phase (as the user has actually indicated that these frames are of the particular constraint type for that event phase). Hence:

(i) For a stationary event phase, the statistics module 408 only uses distance measure type DM-a and generates $\sigma_\theta^2$ according to $$\sigma_\theta^2 = \frac{1}{N_\theta + N_{x,a,\theta}}\left(N_{x,a,\theta} tol_\theta^2 + \sum_1^{N_\theta} d_\theta^2\right),$$

where there are $N_\theta$ frames in total from the one or more event occurrences identified by the user for that stationary phase; the summation is sum of the squares of the respective DM-a type distance measures $d_\theta$ for the $N_\theta$ one-frame motions at those $N_\theta$ frames; and there are $N_{x,a,\theta}$ one-frame motions defined for the entire event.

In some embodiments, the value of $N_\theta$ may be the total number of frames from the one or more event occurrences identified by the user for that stationary phase for which that one-frame motion has a sufficiently small corresponding translation value λ. For example, the one-frame motion for a frame may be discounted and not used in the above calculation of $\sigma_\theta^2$ if the translation value λ for that one frame motion is greater than a threshold value $tol_\lambda$. Here $tol_\lambda$ may be a predetermined threshold or a threshold set by a user, and may specify a degree of translation for a one-frame motion such that, if that one frame motion has a translation above that threshold then it is not considered to be a stationary frame (i.e. a frame with a stationary one-frame motion). The value $tol_\theta$ may be used as a bias or weighting factor (which the GUI module 400 may allow the user to enter via the GUI of FIG. 5, or which may be predetermined). In some embodiments, the value of $tol_\theta$ specifies a threshold on the rotation angle θ for a one frame motion such that the one frame motion may be considered stationary only if θ<$tol_\theta$. An example value for $tol_\theta$ is 4 degrees. The use of $tol_\theta$ avoids the situation during the event matching process (described later) in which a perfectly stationary event phase in a template will only match perfectly stationary frames of the animation. In this way, the matching process (discussed later) is more robust to noise in the animation data. However, it will be appreciated that some embodiments may disregard the value of $tol_\theta$, in which case $$\sigma_\theta^2 = \frac{1}{N_\theta}\left(\sum_1^{N_\theta} d_\theta^2\right).$$

(ii) For a hinge event phase, the statistics module 408 generates $\sigma_\theta^2$ according to $\sigma_\theta^2 = tol_\theta^2$, where $tol_\theta$ is as described above. Again, some embodiments disregard the value $tol_\theta$ and for these embodiments $\sigma_\theta^2=0$.

Additionally, the statistics module 408 uses distance measure type DM-e and generates $$\sigma_x^2 = \frac{1}{N_x}\left(\sum_1^{N_x} d_x^2\right) \text{ and } \sigma_a^2 = \frac{1}{N_a}\left(\sum_1^{N_a} d_a^2\right),$$

where there are $N_x=N_a$ frames in total from the one or more event occurrences identified by the user for that hinge event phase and the summations are sums of the squares of the respective distances measures $d_x$ and $d_a$ for the $N_x=N_a$ one-frame motions at those $N_x=N_a$ frames.

(iii) For a pivot event phase, the statistics module 408 generates $\sigma_\theta^2$ according to $\sigma_\theta^2 = tol_\theta^2$, where $tol_\theta$ is as described above. Again, some embodiments disregard the value $tol_\theta$ and for these embodiments $\sigma_\theta^2=0$.

Additionally, the statistics module 408 uses distance measure type DM-f and generates $$\sigma_x^2 = \frac{1}{N_x}\left(\sum_1^{N_x} d_x^2\right),$$

where there are $N_x$ frames in total from the one or more event occurrences identified by the user for that pivot event phase and the summations are sums of the squares of the respective distances measures $d_x$ for the $N_x$ one-frame motions at those $N_x$ frames.

It will be appreciated that embodiments of the invention may use other statistics to describe the uncertainty in the movement of a joint during a particular event phase and that the above variances $\sigma_\theta^2$, $\sigma_x^2$ and $\sigma_a^2$ are merely exemplary. It will also be appreciated that embodiments of the invention may use other distance measures to describe a similarity (or to make a comparison) between the geometry of a one-frame motion and the geometry for an entire event phase.

4) Event Detection

Once an event template has been created (as described above), it can then be used to detect the occurrence, of one or more events of that event type within an animation of an object (where that object has at least the object parts specified in the event template). This is essentially performed as a matching process, where the timing of the event phases, the geometry of the constrained motions of the joints during the event phases, and the variability of such motions, as defined in the event template, are compared against a target animation. Locations in the target animation which have a particularly good match are then considered to be locations at which an event of that event type occurs. This can therefore be considered as using the event template to filter the sequence of frames of the animation in order to detect those frames which correspond to an event of the event type. This will be described in more detail below.

Figure 8:
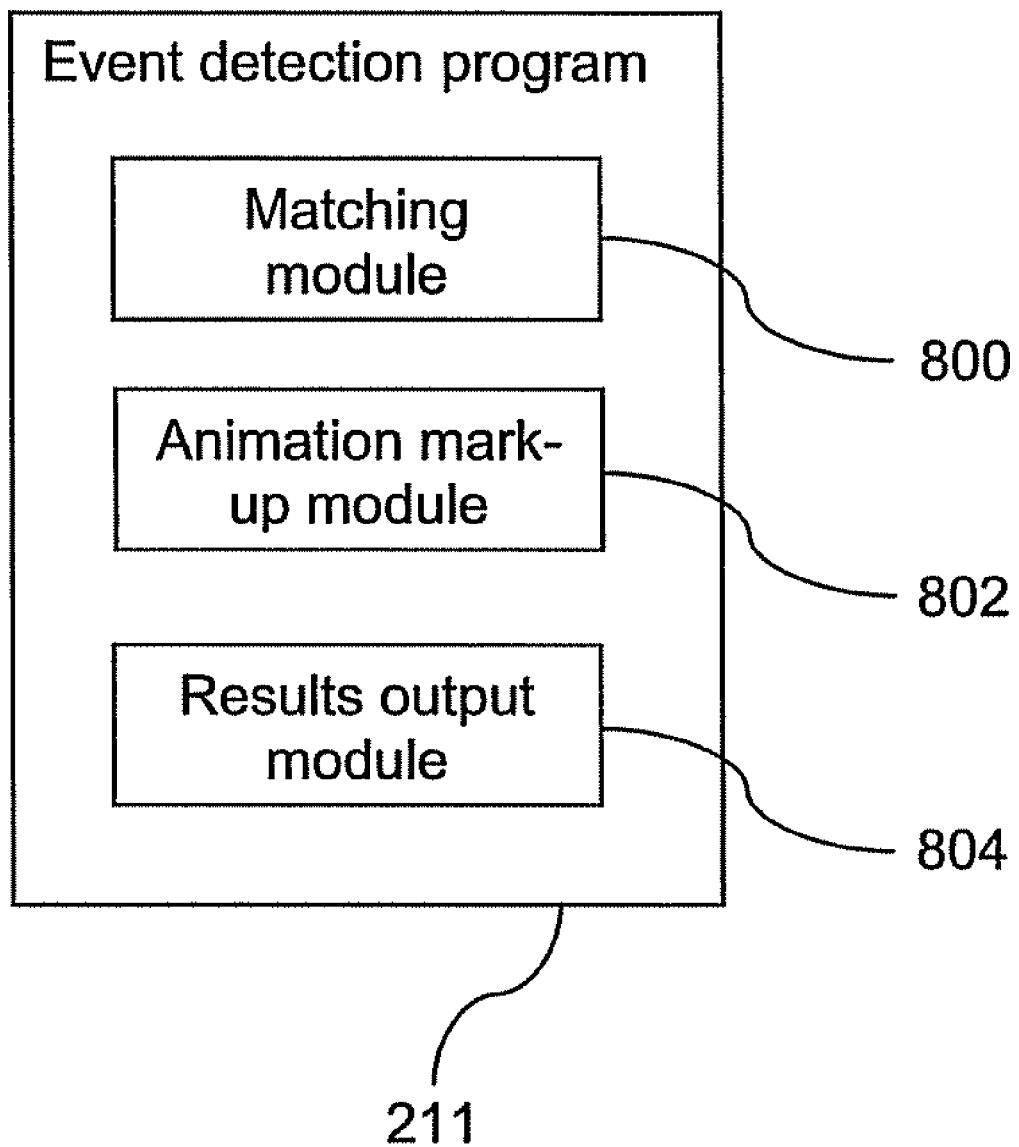
FIG. 8 schematically illustrates an example computer program according to an embodiment of the invention for detecting events in an animation, using an event template.

FIG. 8 schematically illustrates an example computer program 211 according to an embodiment of the invention for detecting events in an animation, using an event template. The computer program 211 may be, for example, one of the computer programs 211 stored in the memory 210 of the computer 202 of FIG. 2 and may be executed by the processor 204 of the computer 202 to carry out an embodiment of the invention.

The computer program 211 comprises a number of modules or program components, including: a matching module 800, an animation mark-up module 802 and a results output module 804. These components may themselves be in the form of one or more separate computer programs or may be functions or routines within a single computer program 211.

The functioning of the computer program 211 shall be described in more detail below with reference to FIG. 9. However, in summary: the matching module 800 is responsible for, and has functionality and code for, automatically comparing an event template against a target animation and detecting when during that target animation, an event of the event type defined by the event template occurs; the animation mark-up module 802 (which is an optional module) is responsible for, and has functionality and code for, automatically adding data (metadata) to the target animation (i.e. marking-up or amending or updating the animation) to store within the target animation data that indicates the location(s) within the target animation at which an event of an event type occurs; and the results output module 804 (which is also an optional module) is responsible for, and has functionality and code for, displaying to a user of the system 200 the location in the target animation of the events detected by the matching module 800.

Figure 9:
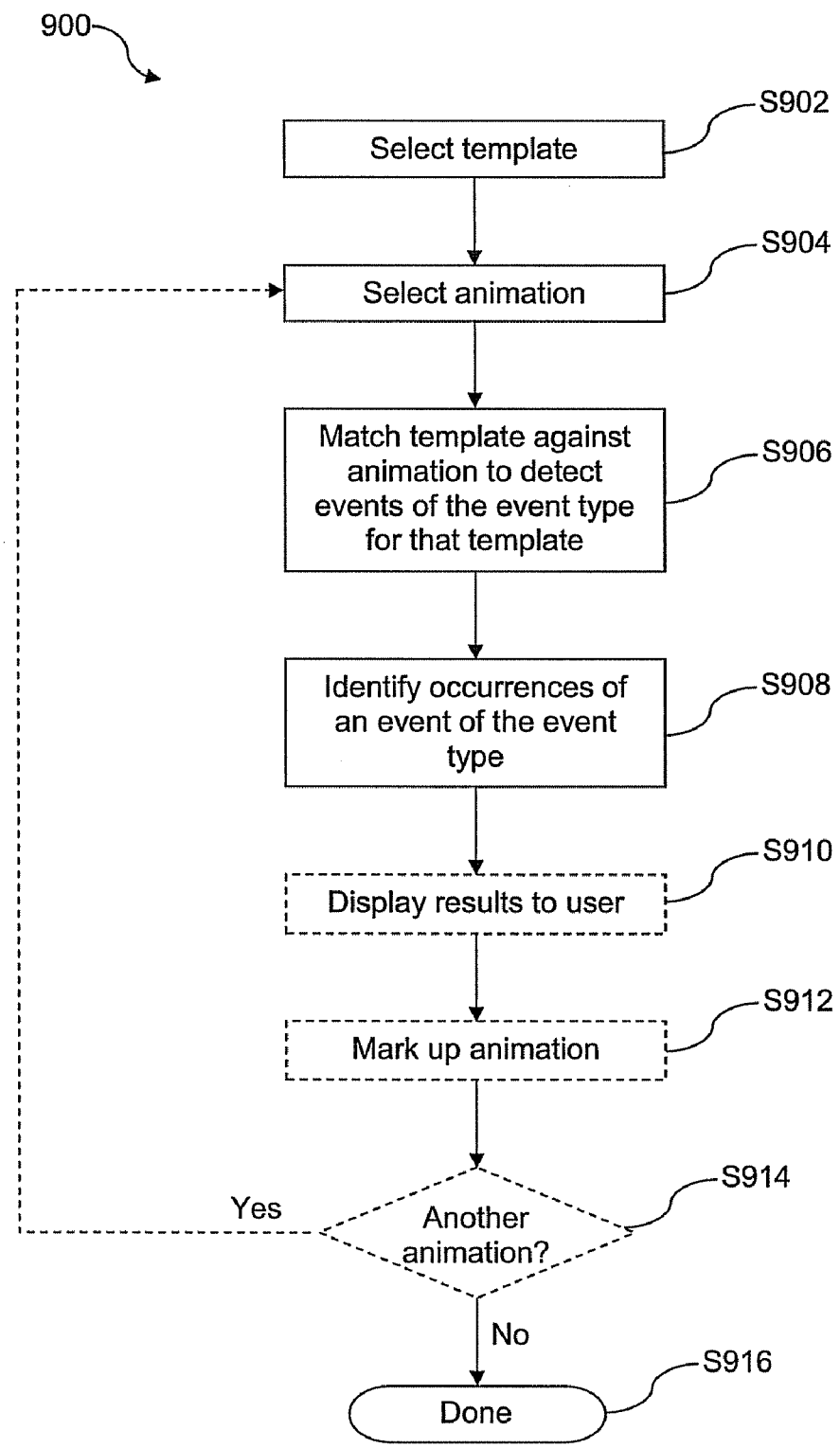
FIG. 9 is a flowchart schematically illustrating an example method 900 for detecting the occurrence of an event of an event type (as defined by an event template) within a target animation.

FIG. 9 is a flowchart schematically illustrating an example method 900 for detecting the occurrence of an event of ah event type (as defined by an event template) within a target animation, according to an embodiment of the invention. In essence, the method 900 of FIG. 9 performs a transformation that takes, as inputs an event template and a target animation and outputs one or more of: data indicating when certain events occur in that target animation; an updated target animation containing that data; or ah updated animation database 212.

At a step S902, an event template is selected (or indicated). This may occur by passing a parameter or variable to the matching module 800 that identifies the event template. Additionally, or alternatively, this may occur by the matching module 800 displaying oh the display 222 to the user of the system 200 a list of available event templates (e.g. all of the event templates being stored in the memory 210 or on a medium 226) and allowing the user to specify one of those event templates.

At a step S904, a target animation is selected. This may occur by passing a parameter or variable to the matching module 800 that identifies the target animation. Additionally or alternatively, this may occur by the matching module 800 displaying on the display 222 to the user of the system 200 a list of available animations 224 in the animation database 212 and allowing the user to specify one of those animations 224.

At a step S906, the matching module 800 determines, for one or more of the frames of the target animation (but normally for each frame of the target animation), a likelihood value that indicates the likelihood or probability that an event of the event type specified the selected event template occurs in the target animation, starting at that frame. The matching module 800 essentially matches, or compares, the event template against the target animation to detect events (or calculate the likelihood values for the occurrence of events) in the target animation. This shall be described in more detail later.

At a step S908, the matching module 800 uses the likelihood values determined at the step S906 to identify any occurrences of an event of the event type. This shall be described in more detail later.

Thus, the steps S906 and S908 involve detecting an occurrence of an event of the event type by detecting a section of the animation during which the respective movements defined by the animation for the specified one or more object parts (as set out in the event template) are constrained in accordance with the sequence of two or more event phases (as set out in the event template).

At ah optional step S910, the results output module 804 may display the results of the steps S906 and S908 on the display 222 to the user of the system 200.

At an optional step S912, the animation mark-up module 802 may add (or include) data (metadata) to the target animation 224 being stored in the animation database 212. In other words, the mark-up module 802 may mark-up (or amend or update) the animation 224 in the animation database 212. The marked-up animation 224 stores data that indicates the locations) or occurrence(s) of events as identified at the step S908. The marked-up animation 224 may also store data that indicates the corresponding event type for those identified events. In this way, the target animation 224 may be transformed into a marked-up animation 224 (with this additional metadata) for storage in the animation database 212.

At an optional step S914, the matching module 800 may determine whether or not another target animation 224 is to be analysed. If another target animation 224 is to be analysed, then processing may return to the step S904; otherwise, processing terminates at a step S916. In this way, the matching module 904 may detect events in one or more animations 224 being stored in the animation database 212, with the animation mark-up module 802 then updating each of those animations 224 so that the animation database 212 then stores animations that comprise respective data indicating when, during those animations, events of the event type occur. Thus, the animation database 212 may be transformed into a marked-up updated animation database 212.

The method 900 may then be repeated in respect of one or more other event templates accordingly.

As mentioned above, at the step S906 the matching module 800 determines or calculates, for one or more of the frames of the target animation, a respective likelihood value that indicates the likelihood or probability that an event of the event type occurs starting at that frame. This shall be described in more detail below.

For the $i^{th}$ frame in the animation, and for a particular joint, the matching module 800 is arranged to determine that joint's one-frame motion at that $i^{th}$ frame using a method as has been described above. In particular, the matching module 800 may determine the screw decomposition (or geometry) for that one-frame motion, which shall be represented by $x_i, \hat{a}_i, \theta_i, \lambda_i$.

The matching module 800 has functionality to determine the conditional probability that, for a particular joint, the $i^{th}$ frame has its particular one-frame motion geometry $x_i, \hat{a}_i, \theta_i, \lambda_i$ under the assumption that that frame is actually part of an event phase, with a specific constraint type, as specified by the event template. In particular, the matching module 800 has functionality or logic to calculate:

$$P(x_i, \hat{a}_i, \theta_i, \lambda_i \mid \text{Stationary}) = \begin{cases} 0 & \text{if } |\lambda_i| > tol_\lambda \\ \exp\left(-\frac{d_\theta^2}{2\sigma_\theta^2}\right) & \text{otherwise} \end{cases} \quad (a)$$

which represents the probability that the $i^{th}$ frame matches (or has) its one-frame motion geometry $x_i, \hat{a}_i, \theta_i, \lambda_i$ under the assumption that the $i^{th}$ frame is part of a stationary event phase.

For this, the value $tol_\lambda$ is a value that specifies a maximum magnitude of translation that is allowable before that one-frame motion is considered to be unconstrained. The value of $tol_\lambda$ may be a user-defined value (which the user may set via the matching module 800), or it may be a predetermined valued.

Thus, if the translation $\lambda_i$ for this one-frame motion has a magnitude larger than $tol_\lambda$, then that one-frame motion is assumed not to be constrained by an identity constraint, and hence the probability is set to 0.

Otherwise, the $i^{th}$ frame is assumed to be a frame from a stationary. phase and so $d_\theta$ is the above-described DM-a type distance measure used to compare the $i^{th}$ frame geometry ($x_i, \hat{a}_i, \theta_i, \lambda_i$) against the geometry for the stationary event phase (x=0, â=0) as set out in the event template, whilst $\sigma_\theta^2$ is the above-mentioned statistic variance for that event phase as set out in the event template.

$$P(x_i, \hat{a}_i, \theta_i, \lambda_1 \mid \text{Hinge}) = \begin{cases} 0 & \text{if } |\lambda_i| > tol_\lambda \\ \gamma\exp\left(-\frac{d_\theta^2}{2\sigma_\theta^2}\right) & \text{if } |\theta_1| < tol_\theta \\ \exp\left(-\frac{d_x^2}{2\sigma_x^2} - \frac{d_a^2}{2\sigma_a^2}\right) & \text{otherwise} \end{cases} \quad (b)$$

which represents the probability that the $i^{th}$ frame matches (or has) its one-frame motion geometry $x_i, \hat{a}_i, \theta_i, \lambda_i$ under the assumption that the $i^{th}$ frame is part of a hinge event phase.

Again, this makes use of the above-described value $tol_\lambda$.

Thus, if the translation $\lambda_i$ for this one-frame motion has a magnitude larger than $tol_\lambda$, then that one-frame motion is assumed not to be constrained by a hinge constraint, and hence the probability is set to 0.

This calculation also makes use of a value $tol_\theta$, which is a value that specifies a minimum magnitude of rotation that is allowable before that one-frame motion is considered to be stationary. The value of $tol_\theta$ may be a user-defined value (which the user may set via the matching module 800), or it may be a predetermined valued.

Thus, if the rotation angle $\theta_i$ for this one-frame motion has a magnitude less than $tol_\theta$, then that one-frame motion is assumed to be constrained by an identity constraint and not by a hinge constraint. In this case, the probability is set to be $$\gamma\exp\left(-\frac{d_\theta^2}{2\sigma_\theta^2}\right),$$

where $d_\theta$ is the above-described DM-b type distance measure used to compare the $i^{th}$ frame geometry ($x_i, \hat{a}_i, \theta_i, \lambda_i$) against the geometry for the hinge event phase (x, â) as set out in the event template, whilst $\sigma_\theta^2$ is the above-mentioned statistic variance for that event phase as set out in the event template. In this embodiment, the value $\gamma$ has been used to impose a loss scale factor (or to weight the probability towards 0) to represent that a stationary frame is being compared against a non-stationary event phase. The value of $\gamma$ lies in the range $0<\gamma<1$ and may be predetermined or may be set by a user (e.g. using the matching module 800). However, some embodiments may omit the use of the value $\gamma$.

Otherwise, the $i^{th}$ frame is assumed to be a frame from a hinge phase or a pivot phase. In this case, the probability is set to be $$\exp\left(-\frac{d_x^2}{2\sigma_x^2} - \frac{d_a^2}{2\sigma_a^2}\right),$$

where $d_x$ and $d_a$ are the above-described DM-e type distance measures used to compare the $i^{th}$ frame geometry ($x_i, \hat{a}_i, \theta_i, \lambda_i$) against the geometry for the hinge event phase (x, â) as set out in the event template, whilst $\sigma_x^2$ and $\sigma_a^2$ are the above-mentioned statistic variances for that event phase as set out in the event template.

$$P(x_i, \hat{a}_i, \theta_i, \lambda_i \mid \text{Pivot}) = \begin{cases} 0 & \text{if } |\lambda_1| > tol_\lambda \\ \gamma\exp\left(-\frac{d_\theta^2}{2\sigma_\theta^2}\right) & \text{if } |\theta_1| < tol_\theta \\ \exp\left(-\frac{d_x^2}{2\sigma_x^2}\right) & \text{otherwise} \end{cases} \quad (c)$$

which represents the probability that the $i^{th}$ frame matches (or has) its one-frame motion geometry $x_i, \hat{a}_i, \theta_i, \lambda_i$ under the assumption that the $i^{th}$ frame is part of a pivot event phase.

Again, this makes use of the above-described value $tol_\theta$.

Thus, if the translation $\lambda_i$ for this one-frame motion has a magnitude larger than $tol_\lambda$, then that one-frame motion is assumed not to be constrained by a pivot constraint, and hence the probability is set to 0.

Again, this makes use of the above-described value $tol_\theta$. Thus, if the rotation angle $\theta_i$ for this one-frame motion has a magnitude less than $tol_\theta$, then that one-frame motion is assumed to be constrained by an identity constraint and not by a point constraint. In this case, the probability is set to be $$\gamma \exp\left(-\frac{d_\theta^2}{2\sigma_\theta^2}\right),$$

where $d_\theta$ is the above-described DM-c type distance measure used to compare the $i^{th}$ frame geometry ($x_i$, $\hat{a}_i$, $\theta_i$, $\lambda_i$) against the geometry for the pivot event phase: (x, $\hat{a}=0$) as set out in the event template, whilst $\sigma_\theta^2$ is the above-mentioned statistic variance for that event phase as set out in the event template.

In this embodiment, the value γ has again been used to impose a loss scale factor to represent that a stationary frame is being compared against a non-stationary event phase. The value of γ lies in the range $0<\gamma<1$ and may be predetermined or may be set by a user (e.g. using the matching module 800). However, some embodiments may omit the use of the value γ;

Otherwise, the $i^{th}$ frame is assumed to be frame from a hinge phase or a pivot phase. In this case, the probability is set to be $$\exp\left(-\frac{d_x^2}{2\sigma_x^2}\right),$$

where $d_x$ is the above-described DM-f type distance measure used to compare the $i^{th}$ frame geometry ($x_i$, $\hat{a}_i$, $\theta_i$, $\lambda_i$) against the geometry for the pivot event phase (x, $\hat{a}=0$) as set out in the event template, whilst $\sigma_x^2$ is the above-mentioned statistic variance for that event phase as set out in the event template.

It will be appreciated that, for embodiments that make use of another constraint type (and which therefore have other types of event phases), the matching module 800 may have functionality or logic to calculate, in general, the value $p(x_i, \hat{a}_i, \theta_i, \lambda_i | \omega)$ which represents the probability that, for this joint, the $i^{th}$ frame matches (or has) a particular one-frame motion geometry $x_i$, $\hat{a}_i$, $\theta_i$, $\lambda_i$ under the assumption that the $i^{th}$ frame is part of an event phase of type ω.

The matching module 800 also has logic or functionality to calculate that, for a particular joint, a sequence of N frames (from the $i^{th}$ frame of the animation to the $(i+N-1)^{th}$ frame of the animation) matches a single event phase for that joint as specified by the event template (where that event phase has a duration of N frames). Each of the N frames has its own one-frame motion screw decomposition geometry for that joint's motion at that frame, and, for ease of explanation, the collection of these geometries shall be represented by F, i.e. $F=\{(x_i, \hat{a}_i, \theta_i, \lambda_i), (x_{i+1}, \hat{a}_{i+1}, \theta_{i+i}, \lambda_{i+1}), \ldots, (x_{i+N-1}, \hat{a}_{i+N-1}, \theta_{i+N-1}, \lambda_{i+N-1})\}$.

The probability that this collection of geometries F (for these N frames starting at the $i^{th}$ frame of the animation) matches a specific event phase with a type of ω is therefore $$P_i(F|\omega) = \frac{1}{N}\sum_{k=1}^{N} P(x_{i+k-1}, \hat{a}_{i+k-1}, \theta_{i+k-1}, \lambda_{i+k-1} | \omega),$$

which may be calculated using the above methods for calculating $P(x_i, \hat{a}_i, \theta_i, \lambda_i | \omega)$.

Some embodiments of the invention assume that an event phase in a target animation may have a different duration from the duration of N frames for that event phase as set out in the event template. Hence, the matching module 800 also has logic or functionality to calculate that a sequence of N+d frames, from the $i^{th}$ frame of the animation to the $(i+N+d-1)^{th}$ frame of the animation, matches that single event phase specified by the event template (where that event phase has a duration of N frames). This probability may be calculated as $$P_i(F|\omega) = \frac{1}{N+d}\sum_{k=1}^{N+d} P(x_{i+k-1}, \hat{a}_{i+k-1}, \theta_{i+k-1}, \lambda_{i+k-1} | \omega),$$

where, of course, $F=\{(x_i, \hat{a}_i, \theta_i, \lambda_i), (x_{i+1}, \theta_{i+1}, \lambda_{i+1}), \ldots, (x_{i+N+d-1}, \hat{a}_{i+N+d-1}, \lambda_{i+N+d-1})\}$.

The value of d may be positive, in which case the duration of the event phase in the target animation is being assumed to last longer (i.e. for more frames) than the N frames specified for that event phase in the event template. The value of d may be negative (although riot less than −(N−1)), in which case the duration of the event phase in the target animation is being assumed to be shorter (i.e. for less frames) than the N frames specified for that event phase in the event template. Of course, the value of d could be 0,), in which case the duration of the event phase in the target animation is being assumed to be the same length as the N frames specified for that event phase in the event template.

Moreover, some embodiments weight (or penalise) the probability as the magnitude of d increases, i.e. as the duration of the event phase in the target animation deviates more from the N frames specified for the duration of that event phase in the event template. In such embodiments, the matching module 800 may calculate $$P_i(F|\omega) = \frac{\beta}{N+d}\sum_{k=1}^{N+d} P(x_{i+k-1}, \hat{a}_{i+k-1}, \theta_{i+k-1}, \lambda_{i+k-1} | \omega)$$

where β is a biasing or weighting factor $\beta=\tau^{|d|}$ for some value τ in the range $0<\tau<1$ (so that β decreases as the magnitude of d increases). Preferred embodiments set τ to be 0.9. In this way, the biasing factor β weights $P_i(F|\omega)$ in favour of sections in the target animation that are the same (or near to the same) length as the duration specified for the event phase in the event template. In this way, the probability value calculated is weighted based on a degree of similarity between the durations of the event phase (as specified by the event template) and the duration of the corresponding section of the animation (as adjusted by d).

A timing profile D may be determined by the matching module 800. The timing profile specifies, for the $k^{th}$ event phase in the event template, a number of frames t(k,D) as an offset from the beginning of the event in the target animation at which that event phase is assumed to occur. The timing profile D may also specify a value $d_k$ (analogous to the value d above) for that $k^{th}$ event phase indicating the difference between the number of frames for that event phase according to the timing profile D and the number of frames for that event phase as specified by the event template. In some embodiments, though, the timing profiles may assume the same value of d for each event phase.

The timing profile D specifies such data for each of the event phases for the current event type.

The matching module 800 then also has logic or functionality to determine a probability or likelihood value that, for each given joint specified in the template, frames from the target animation frame starting at the $i^{th}$ frame and with subsequent frames of the animation in accordance with a given timing profile D, match the event template. This likelihood value may be calculated as $$g_D(i) = \frac{1}{N_\omega N_J} \sum_{k=1}^{N_\omega} \sum_{j=1}^{N_J} P^j_{i+t(k,D)}(F_j \mid \omega_k)$$

where: $N_\omega$ is the number of event phases specified in the event template and $\omega_k$ is the constraint type (or event phase type) for the $k^{th}$ event phase; $N_J$ is the number of joints specified in the event template; and $F_j$ is the collection of event geometries for the $j^{th}$ joint for the frames of the relevant $k^{th}$ event phase as specified by the timing profile D.

In this way, for the $i^{th}$ frame, the matching module 800 may (a) identify a sequence of sections of the animation (using the timing profile D) by identifying, for each event phase, a corresponding section of the animation based on that time-point and the timing data indicating when that event phase occurs during an event of the event type; and (b) calculating a likelihood value for the sequence of sections of the animation, wherein the likelihood value represents a probability that, for each event phase, the respective movements defined by the animation for the one or more specified object parts during the corresponding section of the animation identified in step (a) are constrained in accordance with the constraint type associated with that event phase.

The matching module 800 may then use a plurality of $N_D$ timing profiles $D_{1,i} \ldots D_{N_D,i}$ for the $i^{th}$ frame and calculate a likelihood value $g_{D_{r,i}}(i)$ for each of these timing profiles, for $r=1 \ldots N_D$ (i.e. repeating the above steps (a) and (b) for each timing profile). The matching module 800 may then select the timing profile $D_{r,i}$ that provides a maximum (or largest) value of $g_{D_{r,i}}(i)$ and store both that timing profile $D_{r,i}$ and the corresponding likelihood value $g(i)=g_{D_{r,i}}(i)$ in the memory 210 for that $i^{th}$ frame.

The plurality of $N_D$ timing profiles $D_{1,i} \ldots D_{N_D,i}$ for the $i^{th}$ frame may be determined by varying the duration of each section of the animation that is to correspond to an event's phase. This may be achieved, for example, by varying the duration of a section of the animation in a range containing the duration (as specified by the event template) of the corresponding event phase.

Thus, using the above calculations, the matching module 800 is arranged to effectively perform, at the step S906, a convolution of the event template over the frame-by-frame motion of the target animation. In doing so, a variation in the timings and durations of the event phases may be allowed, and the best timing profile may be determined for each frame.

It will be appreciated that embodiments of the invention may go about calculating the likelihood values g(i) using different equations from those above. Additionally, some embodiments of the invention may store a number of the intermediate values so that they do not need to be re-calculated at a later stage. For example, the calculations of g(i) and g(i+1) will involve many of the same probability values, and hence calculating g(i+1) may be made quicker by reusing the relevant probability values calculated earlier when determining g(i).

Figure 10:
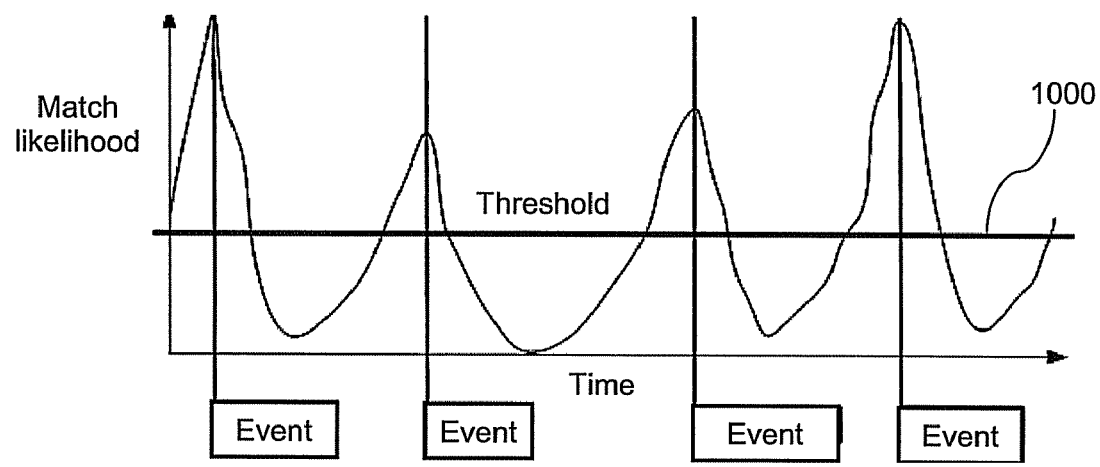
FIG. 10 is a graph schematically illustrating example likelihood values generated by a matching module.

As mentioned above, at the step S908, the matching module 800 uses the likelihood values determined at the step S906 to identify any occurrences in the target animation 224 of an event of the event type. FIG. 10 is a graph schematically illustrating example likelihood values generated by the matching module 802 at the step S906. The matching module 802 may use a threshold 1000 (which may be predetermined or may be set by the user). The matching module 802 determines that an event has occurred if the likelihood values exceed the threshold 1000. The event is considered to have occurred at the $i^{th}$ frame (i.e. to have commenced from the $i^{th}$ frame) if the likelihood g(i) for the $i^{th}$ frame is a local maximum in the time-sequence of calculated likelihood values.

FIG. 10 illustrates four such local maxima, and hence the matching module 800 detects the location of four occurrences of an event of the event type specified by the template. The timing and duration of these events may then be retrieved from the memory 210, as this data was stored for each tested frame at the step S906. As can be seen, in the example of FIG. 10, the durations of the four detected events are different.

The matching module 800 may be arranged, at the step S906, to perform some processing on the time-sequence of calculated likelihood values g(i). For example, the matching module 800 may filter the time-sequence of calculated likelihood values g(i) so as to remove noise. Additionally, or alternatively, if local maxima above the threshold 1000 occur at the $i^{th}$ and $j^{th}$ frame (so that it appears that two distinct events have occurred starting at these two frames respectively), but the timing profiles for the $i^{th}$ and $j^{th}$ frames ($D_{r,i}$ and $D_{r,j}$) indicate that these two events would overlap during the animation, then the matching module 800 may be arranged to disregard (or suppress) the event with the lower likelihood value (g(i) or g(j)), i.e. to not register or determine an event as having occurred starting at the $i^{th}$ (or $j^{th}$) frame in this situation if g(i)<g(j) (or g(j)<g(i)).

As mentioned above, the threshold 1000 may be a predetermined value or may be a value set by the user of the system 200. Alternatively, the matching module 800 may be arranged to calculate the threshold 1000 based on the time-sequence of calculated likelihood values g(i) produced at the step S906. For example, the matching module 800 may be arranged to (a) calculate an average $A_p$ (such as the median or mean) of the local maxima (or peaks) in the likelihood values; (b) calculate an average $A_t$ (such as the median or mean) of the local minima (or troughs) in the likelihood values; and then (c) set the threshold 1000 based on $A_p$ and $A_t$. Step (c) may involve setting the threshold 1000 to be a certain fraction or proportion between $A_p$ and $A_t$, such as setting the threshold 1000 to be $\alpha A_t + (1-\alpha) A_p$ for some value $\alpha$ in the range $0 \leq \alpha \leq 1$. The value of $\alpha$ may itself be predetermined or it may be set by the user of the system 200.

The step S910 may involve displaying the graph of FIG. 10 on the display 222.

5) Uses of the Marked-Up Animations

There are many uses for animations that have been marked-up as described above so as to contain data indicating the occurrences or timings of events.

For example, animation blending can benefit from the use of marked-up animations. Animation blending is a process of combining (or blending) two separate animations of an object in order to produce another animation of that object. For example, an animation of a person walking and an animation of that person running could be blended in order to produce an animation of that person jogging or moving at a whole range of speeds between the walk speed and the running speed. Similarly, an animation of a person in a crouching position, could be blended with an animation of a person in a standing position in order to produce an animation of the person actually performing a standing or crouching motion.

As is known, animation blending involves interpolating the skeletal geometric data provided by the animations for each joint of the object. However, it is preferable if the interpolation is performed so that the animations are synchronised, i.e. the occurrence of certain events in the animations are synchronised, or are timed so as to occur together. For the example above of interpolating between a walking animation and a running animation, it would be preferable to ensure that a footfall in the walking animation is interpolated with a corresponding footfall in the running animation, as otherwise various artefacts are produced.

Thus, the animation blending may use the data in the marked-up animations to ascertain when certain events (such as left footfalls and right footfalls) occur, and re-time (e.g. stretch or speed up, or squash or slow down) one or both of the animations (by interpolating between the frames of that animation) prior to performing the interpolation between the animations in order to ensure that these events occur at the same time during the animations that are to be blended.

Events may be used for other synchronisation purposes, such as:
- triggering transitions in an animation—e.g. transitioning from a jump into a run cannot be allowed to occur until an appropriate transition point (e.g. a "landing event" has occurred);
- triggering actions (such as point scoring) during a game— e.g. a point may be scored if the user controls an animated character in a manner such that a certain event in the animation of the character occurs.

6) Other Alternatives

The above-described embodiments of the invention involve the generation and use of event templates that specify one or more, object parts and a sequence of two or more event phases that occur during an event. However, it will be appreciated that, in alternative embodiments of the invention, the event template may specify two or more object parts and a single event phase that occurs during an event of the event type being specified by the event template. The above description for the generation and use of an event template applies mutatis mutandis to such an alternative event template.

It will be appreciated that embodiments of the invention may be implemented using a variety of different information processing systems. In particular, although FIG. 2 and the discussion thereof provide an exemplary computing architecture, this is presented merely to provide a useful reference in discussing various aspects of the invention. Of course, the description of the architecture has been simplified for purposes of discussion, and it is just one of many different types of architecture that may be used for embodiments of the invention. It will also be appreciated that, in the various figures, the boundaries between logic blocks are merely illustrative and that alternative embodiments may merge logic blocks or elements, or may impose an alternate decomposition of functionality upon various logic blocks or elements.

As described above, the system 200 comprises a computer 202. It will be appreciated that the computer 202 may be in many forms, such as a personal computer system, mainframes, minicomputers, servers, workstations, notepads, personal digital assistants, and mobile telephones.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program", as used herein, may be a sequence of instructions designed for execution on a computer system, and may include a subroutine, a function, a procedure, an object method, an object implementation, an executable application, an applet, a servlet, source code, object code, a shared library a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of detecting an occurrence of an event of an event type during an animation, in which the animation comprises, for each of a plurality of object parts of an object, data defining the respective movement of that object part at each of a sequence of time-points for the animation, the method implemented through one or more processing units and comprising:
   indicating the event type, wherein the event type specifies:
      one or more of the object parts; and
      a sequence of two or more event phases that occur during an event of that event type such that, for each event phase, the respective movements of the one or more specified object parts during that event phase are each constrained according to a constraint type associated with that event phase; and
   detecting an occurrence of an event of the event type by detecting a section of the animation during which the respective movements defined by the animation for the specified one or more object parts are constrained in accordance with the sequence of two or more event phases.

2. The method according to claim 1, in which the constraint type for an event phase specifies that, during that event phase, at least one degree of freedom is constrained for the respective movements of the specified one or more object parts.

3. The method according to claim 1, in which the constraint type for an event phase specifies that, during that event phase, all of the specified one or more object parts undergo no translation in one or more respective directions and/or undergo no rotation in one or more respective directions.

4. The method according to claim 1, in which the constraint type for an event phase specifies one of:
   a constraint specifying that each of the specified one or more object parts remains stationary during that event phase;
   a constraint specifying that each of the specified one or more object parts rotates about a respective straight line of fixed points during that event phase; or
   a constraint specifying that each of the specified one or more object parts pivots about a respective fixed point during that event phase.

5. The method according to claim 1, in which specifying the sequence of two or more event phases comprises providing timing data that indicates, for each event phase, when that event phase occurs during an event of the event type.

6. The method according to claim 5, in which detecting an occurrence of an event of the event type comprises:
for one or more of the time-points:
(a) identifying a sequence of sections of the animation by identifying, for each event phase, a corresponding section of the animation based on that time-point and the timing data indicating when that event phase occurs during an event of the event type; and
(b) calculating a likelihood value for the sequence of sections of the animation, wherein the likelihood value represents a probability that, for each event phase, the respective movements defined by the animation for the one or more specified object parts during the corresponding section of the animation identified in step (a) are constrained in accordance, with the constraint type associated with that event phase.

7. The method according to claim 6, in which detecting an occurrence of an event of the event type further comprises, for each of the one or more time-points, detecting an event of the event type as occurring at that time-point if the likelihood value calculated for that time-point is above a threshold value.

8. The method according to claim 6, in which detecting an occurrence of an event of the event type comprises:
for each of the one or more time-points:
repeating step (a) to identify a plurality of different sequences of sections of the animation;
repeating step (b) to calculate a likelihood value for each of the different sequences of sections of the animation; and
determining the sequence of sections of the animation identified at step (a) that results in a largest likelihood value at step (b).

9. The method according to claim 8, in which identifying the plurality of different sequences of sections of the animation for a time-point comprises, for one or more of the event phases, varying the duration of the corresponding section of the animation to identify the different sequences of sections of the animation.

10. The method according to claim 9, in which varying the duration of the section of the animation corresponding to an event phase comprises varying that duration within a range of durations containing a duration of that event phase.

11. The method according to claim 9, in which the likelihood value calculated at step (b) for a particular sequence of sections of the animation is weighted based on a degree of similarity between the durations of the event phases and the durations of the corresponding sections of the animation of that particular sequence.

12. The method according to claim 8, in which detecting an occurrence of an event of the event type further comprises, for each of the one or more time-points, detecting an event of the event type as occurring at that time-point if the largest likelihood value calculated for that time-point is above a threshold value.

13. The method according to claim 6, in which the event type also specifies, for each event phase and for each object part, one or more motion parameters that characterise movement of that object part during that event phase, wherein, step (b) calculates the likelihood value based on these motion parameters.

14. The method according to claim 13, in which the one or more motion parameters for an event phase and an object part comprise data representing a degree of variance of a particular motion of that object part during that event phase.

15. The method according to claim 13, in which the one or more motion parameters for an event phase and an object part comprise data representing geometry for the movement of that object part.

16. The method according to claim 15, in which, for at least one event phase, the data representing geometry identifies at least one of:
an axis about which that object part rotates during that event phase; and
a point about which that object part pivots during that event phase.

17. The method of claim 1 comprising updating the animation, by storing in the animation data that indicates the event type and the location in the animation of the detected occurrence.

18. The method of claim 17, the method comprising:
updating an animation database wherein for each of one or more animations in the animation database, updating that animation using the method according to claim 17.

19. A computer storage medium storing computer-executable instructions for carrying out the method of claim 1.

20. A method of defecting an occurrence of an event of an event type during an animation, in which the animation comprises, for each of a plurality of object parts of an object, data defining the respective movement of that object part at each of a sequence of time-points for the animation, the method implemented through one or more processing units and comprising:
indicating the event type, wherein the event type specifies:
two or more of the object parts; and
an event phase that occurs during an event of that event type such that, for that event phase, the respective movements of the two or more specified object parts during that event phase are each constrained according to a constraint type associated with that event phase; and
detecting an occurrence of an event of the event type by detecting a section of the animation during which the respective movements defined by the animation for the specified two or more object parts are constrained in accordance with the constraint type of the specified event phase.

21. A method of generating a description of an event of an event type that occurs during an animation, in which the animation comprises, for each of a plurality of object parts of an object, data defining the respective movement of that object part at each of a sequence of time-points for the animation, the method implemented through one or more processing units and comprising:
specifying one or more of the object parts that are involved in an event of the event type;
specifying a sequence of two or more event phases that occur during an event of the event type and, for each event phase, an associated constraint type such that, for each event phase, the respective movements of the one or more specified object parts during that event phase are each constrained according to the constraint type associated with that event phase;
identifying one or more occurrences in the animation of an event of the event type and, for each of the one or more occurrences, when in the animation each event phase occurs;
for each event phase, using the respective movements of the one or more specified object parts during that event phase in each of the one or more identified occurrences of an event of the event type to automatically calculate geometry data representing the constraint type associated with that event phase; and
storing a description of the event type, wherein the description comprises: data identifying the one or more specified object parts, the specified sequence of the two or more event phases, and the constraint types associated with the event phases; and the geometry data for each event phase.

22. The method according to claim 21, in which the constraint type for an event phase specifies that, during that event phase, at least one degree of freedom is constrained for the respective movements of the specified one or more object parts.

23. The method according to claim 21, in which the constraint type for an event phase specifies that, during that event phase, all of the specified one or more object parts undergo no translation in one or more respective directions and/or undergo no rotation in one or more respective directions.

24. The method according to claim 21, in which the constraint type for an event phase specifies one of:
   a constraint specifying that each of the specified one or more object parts remains stationary during that event phase;
   a constraint specifying that each of the specified one or more object parts rotates about a respective straight line of fixed points during that event phase; or
   a constraint specifying that each of the specified one or more object parts pivots about a respective fixed point during that event phase.

25. A The method according to claim 21, comprising:
   for each event phase and each of the specified one or more object parts, using the respective movements of that object part during that event phase in each of the one or more identified occurrences of an event of the event type to automatically calculate statistics data representing a degree of variance of the respective movement of that object part during that event phase;
   wherein the step of storing is arranged such that the description also comprises the calculated statistics data.

26. A computer storage medium storing computer-executable instructions for carrying out the method of claim 21.

27. A method of generating a description of an event of an event type that occurs during an animation, in which the animation comprises, for each of a plurality of object parts of an object, data defining the respective movement of that object part at each of a sequence of time-points for the animation, the method implemented through one or more processing units and comprising:
   a user specifying two or more of the object parts that are involved in an event of the event type;
   the user specifying an event phase that occurs during an event of the event type and an associated constraint type such that the respective movements of the two or more specified object parts during that event phase are each constrained according to the constraint type associated with that event phase;
   the user identifying one or more occurrences in the animation of an event of the event type and, for each occurrence, when in the animation the event phase occurs;
   using the respective movements of the two or more specified object parts during the event phase in each of the one or more identified occurrences of an event of the event type to automatically calculate geometry data representing the constraint type associated with the event phase; and
   storing a description of the event type, wherein the description comprises: data identifying the two or more specified object parts, the specified event phase, and the constraint type associated with the event phase; and the geometry data for the event phase.

28. An apparatus arranged to detect an occurrence of an event of an event type during an animation, in which the animation comprises, for each of a plurality of object parts of an object, data defining the respective movement of that object part at each of a sequence of time-points for the animation, the apparatus comprising:
   a memory unit storing an indication of the event type, wherein the event type specifies:
   one or more of the object parts; and
   a sequence of two or more event phases that occur during an event of that event type such that, for each event phase, the respective movements of the one or more specified object parts during that event phase are each constrained according to a constraint type associated with that event phase; and
   a processor arranged to execute an event defection module to detect an occurrence of an event of the event type by detecting a section of the animation during which the respective movements defined by the animation for the specified one or more object parts are constrained in accordance with the sequence of the two or more event phases.

29. An apparatus arranged to generate a description of an event of an event type that occurs during an animation, in which the animation comprises, for each of a plurality of object parts of an object, data defining the respective movement of that object part at each of a sequence of time-points for the animation, the apparatus comprising a memory unit and a processor, wherein:
   the processor is arranged to execute a user interface module to allow a user to:
   specify one or more of the object parts that are involved in an event of the event type;
   specify a sequence of two or more event phases that occur during an event of the event type and; for each event phase, an associated constraint type such that, for each event phase, the respective movements of the one or more specified object parts during that event phase are each constrained according to the constraint type associated with that event phase; and
   identify one or more occurrences in the animation of an event of the event type and, for each occurrence, when in the animation each event phase occurs;
   the processor is arranged to execute a module that uses the respective movements of the one or more specified object parts during that event phase in each of the one or more identified occurrences of an event of the event, type to automatically calculate geometry data representing the constraint type associated with that event phase; and
   the processor is arranged to store, in the memory unit, a description of the event type, wherein the description comprises: data identifying the one or more specified object parts, the specified sequence of two or more event phases, and the constraint types associated with the event phases; and the geometry data for each event phase.

* * * * *